US011223261B2

(12) United States Patent
Okudaira et al.

(10) Patent No.: US 11,223,261 B2
(45) Date of Patent: Jan. 11, 2022

(54) RESIN SEALING DEVICE AND RESIN SEALING METHOD FOR MANUFACTURING MAGNET EMBEDDED CORE

(71) Applicant: Kuroda Precision Industries Ltd., Kanagawa (JP)

(72) Inventors: Hironobu Okudaira, Kanagawa (JP); Tomoaki Murayama, Nagano (JP); Osamu Fukuyama, Kanagawa (JP)

(73) Assignee: Kuroda Precision Industries Ltd., Kawasaki (JP)

( * ) Notice: Subject to any disclaimer, the term of this patent is extended or adjusted under 35 U.S.C. 154(b) by 424 days.

(21) Appl. No.: 16/092,257

(22) PCT Filed: Sep. 9, 2016

(86) PCT No.: PCT/JP2016/004123
§ 371 (c)(1),
(2) Date: Oct. 9, 2018

(87) PCT Pub. No.: WO2017/179087
PCT Pub. Date: Oct. 19, 2017

(65) Prior Publication Data
US 2019/0190361 A1    Jun. 20, 2019

(30) Foreign Application Priority Data

Apr. 13, 2016    (WO) .................. PCT/JP2016/002009

(51) Int. Cl.
*H02K 15/03*    (2006.01)
*H02K 1/27*    (2006.01)
(Continued)

(52) U.S. Cl.
CPC ........... *H02K 15/125* (2013.01); *B29C 43/18* (2013.01); *B29C 45/03* (2013.01);
(Continued)

(58) Field of Classification Search
CPC .......... H02K 15/03; H02K 15/02; H02K 1/27; H02K 1/276; H02K 1/28; B29C 43/18; B29C 45/80
See application file for complete search history.

(56) References Cited

U.S. PATENT DOCUMENTS 3,488,410 A    1/1970    Downes
3,543,344 A *  12/1970   Hunt ....................... B29C 33/00
                                                            425/394
(Continued)

FOREIGN PATENT DOCUMENTS

CN    101356711 A    1/2009
CN    102843000 A    12/2012
(Continued)

OTHER PUBLICATIONS

European Search Report for EP16898547.1 dated Nov. 11, 2019, 12 pages.
(Continued)

*Primary Examiner* — Edgardo San Martin
(74) *Attorney, Agent, or Firm* — Dority & Manning, P.A.

(57) ABSTRACT

A magnet embedded core is manufactured in a stable manner even when using a die clamping device having a large rated clamping force by preventing an excessive pressurizing force from being applied to a laminated iron core, performing the clamping with an appropriate pressurizing force so to minimize leakage of the resin out of magnet insertion holes, and suppressing a reduction in the geometric and dimensional precision of the laminated iron core. A die clamping device for driving a moveable platen in a direction toward and away from a fixed lower platen is configured to include a toggle link mechanism. In a fully extended state of the toggle link mechanism, an upper die abuts an end surface of the laminated iron core to close openings of the magnet
(Continued)

insertion holes and pressurize the laminated iron core in a laminating direction.

5 Claims, 18 Drawing Sheets

(51) Int. Cl.
| | |
|---|---|
| *B29C 45/80* | (2006.01) |
| *B29C 43/18* | (2006.01) |
| *H02K 15/12* | (2006.01) |
| *H02K 1/28* | (2006.01) |
| *H02K 11/20* | (2016.01) |
| *H02K 11/21* | (2016.01) |
| *H02K 11/30* | (2016.01) |
| *B29C 45/03* | (2006.01) |
| *B29C 45/14* | (2006.01) |
| *B29C 45/76* | (2006.01) |
| *F16H 25/20* | (2006.01) |
| *H02K 7/06* | (2006.01) |
| *B29K 101/10* | (2006.01) |
| *B29K 105/00* | (2006.01) |
| *B29L 31/00* | (2006.01) |

(52) U.S. Cl.
CPC .... *B29C 45/14467* (2013.01); *B29C 45/7653* (2013.01); *B29C 45/80* (2013.01); *F16H 25/20* (2013.01); *H02K 1/276* (2013.01); *H02K 1/28* (2013.01); *H02K 7/06* (2013.01); *H02K 11/20* (2016.01); *H02K 11/21* (2016.01); *H02K 11/30* (2016.01); *H02K 15/03* (2013.01); *H02K 15/12* (2013.01); *B29C 2043/182* (2013.01); *B29C 2945/76006* (2013.01); *B29C 2945/76083* (2013.01); *B29C 2945/76568* (2013.01); *B29K 2101/10* (2013.01); *B29K 2105/251* (2013.01); *B29K 2995/0008* (2013.01); *B29L 2031/7498* (2013.01); *F16H 2025/2053* (2013.01)

(56) References Cited

U.S. PATENT DOCUMENTS

| | | | |
|---|---|---|---|
| 3,568,554 A | | 3/1971 | Wiechee |
| 4,076,780 A | * | 2/1978 | Ditto ............... B29C 43/58 264/294 |
| 4,204,822 A | * | 5/1980 | Hewitt ............ B29C 43/3607 425/210 |
| 4,557,889 A | * | 12/1985 | Masuda ............ B29C 43/04 264/320 |
| 4,648,823 A | * | 3/1987 | Yashima ........... B30B 15/245 100/46 |
| 4,759,280 A | * | 7/1988 | Malashenko ....... B30B 1/323 100/214 |
| 4,855,097 A | * | 8/1989 | Iseler .............. B29C 37/0064 264/102 |
| 4,923,383 A | | 5/1990 | Kurumaji |
| 5,156,782 A | * | 10/1992 | Ballantyne ........ B30B 15/007 100/258 A |
| 7,897,089 B2 | * | 3/2011 | Matsubayashi ..... B29C 45/021 264/279 |
| 8,896,177 B2 | | 11/2014 | Kim |
| 8,991,035 B2 | | 3/2015 | Sasaki et al. |
| 2009/0085416 A1 | | 4/2009 | Masuzawa et al. |
| 2009/0189309 A1 | | 7/2009 | Matsubayashi |
| 2010/0083486 A1 | | 4/2010 | Amano et al. |
| 2013/0069747 A1 | | 3/2013 | Honkura et al. |
| 2014/0042856 A1 | | 2/2014 | Miyashita et al. |
| 2014/0124978 A1 | | 5/2014 | Mabu |
| 2014/0131919 A1 | | 5/2014 | Mabu |
| 2014/0196276 A1 | | 7/2014 | Nagai et al. |
| 2014/0327329 A1 | | 11/2014 | Kitada |
| 2015/0054196 A1 | | 2/2015 | Ishimatsu et al. |
| 2019/0044423 A1 | * | 2/2019 | Fukuyama ......... H02K 1/276 |

FOREIGN PATENT DOCUMENTS

| | | | | |
|---|---|---|---|---|
| DE | 102011078419 | | 6/2012 | |
| DE | 102011119512 | | 5/2013 | |
| EP | 3567707 A1 | * | 11/2019 | ............ H01F 3/04 |
| JP | 2001169485 | | 6/2001 | |
| JP | 2001352747 | | 12/2001 | |
| JP | 2002272033 | | 9/2002 | |
| JP | 2005185081 | | 7/2005 | |
| JP | 2006211748 | | 8/2006 | |
| JP | 2006311782 | | 11/2006 | |
| JP | 2007110880 | | 4/2007 | |
| JP | 2009100634 | | 5/2009 | |
| JP | 2009171785 | | 7/2009 | |
| JP | 2010213536 | | 9/2010 | |
| JP | 2012010595 | | 1/2012 | |
| JP | 2012223024 | | 11/2012 | |
| JP | 2014007926 | | 1/2014 | |
| JP | 2014018074 | | 1/2014 | |
| JP | 2014079056 | | 5/2014 | |
| JP | 2014083811 | | 5/2014 | |
| JP | 2014093917 | | 5/2014 | |
| JP | 2014138448 | | 7/2014 | |
| JP | 2014143919 | | 8/2014 | |
| JP | 2015039296 | | 2/2015 | |
| JP | 2015089169 | | 5/2015 | |

OTHER PUBLICATIONS

European Search Report for EP16898548.9 dated Nov. 11, 2019, 17 pages.
International Search Report for PCT/JP2016/002009 dated Jul. 7, 2016, 2 pages.
International Search Report for PCT/JP2016/004123 dated Nov. 24, 2016, 4 pages.
International Search Report for PCT/JP2016/082291 dated Jan. 18, 2017, 2 pages.
International Search Report for PCT/JP2017/012034 dated Jun. 12, 2017, 2 pages.
International Search Repor for PCT/JP2017/014700 dated Jun. 29, 2017, 6 pages.
Japanese Office Action for Application No. 2017-528861 dated Jan. 16, 2018, 4 pages.
Japanese Office Action for Application No. 2017-20099 dated Feb. 13, 2018, 4 pages.

* cited by examiner

RESIN SEALING DEVICE AND RESIN SEALING METHOD FOR MANUFACTURING MAGNET EMBEDDED CORE

CROSS REFERENCE TO RELATED APPLICATIONS

This application is the U.S. National Stage entry of International Application Number PCT/JP2016/004123 filed under the Patent Cooperation Treaty having a filing date of Sep. 9, 2016, which claims priority to International Application Number PCT/JP2016/002009 filed under the Patent Cooperation Treaty having a filing date of Apr. 13, 2016, which are incorporated herein by reference.

TECHNICAL FIELD

The present invention relates to a resin sealing device and a resin sealing method for manufacturing a magnet embedded core, and in particular to a resin sealing device and a resin sealing method for manufacturing a magnet embedded core for use in rotating electric machinery.

BACKGROUND ART

It is known to implement a rotor core or a stator core of a rotating electric machinery such as an electric motor and an electric power generator as a magnet embedded core manufactured by inserting a magnet piece into each of a plurality of magnet insertion holes opening out at least at one of the end surfaces of a laminated iron core, and sealing the magnet piece with resin that is filled in the magnet insertion hole. See Patent Document 1, for instance.

The resin sealing process for a magnet embedded core can be performed by using a resin sealing device which is similar to an injection molding device, and comprises a fixed platen, a moveable platen placed opposite to the fixed platen so as to be moveable in a direction toward and away from the fixed platen, a die clamping device configured to drive the moveable platen in the direction toward and away from the fixed platen, a fixed die secured to the fixed platen so as to have a laminated iron core that is to be sealed with resin mounted thereon, and a moveable die secured to the moveable platen so as to abut onto the end surface of the laminated iron core upon clamping by the die clamping device to close the openings of the magnet insertion holes and pressurize the laminated iron core in the laminating direction.

By the die clamping performed in this manner, the resin charged into the resin insertion holes is prevented from leaking out, and thus, the magnet pieces can be sealed with resin in a reliable manner.

The laminated iron core is formed by laminating or stacking a plurality of iron core laminates which are blanked into a prescribed shape. Therefore, when the laminated iron core is pressurized in the laminating direction by the clamping, the gaps between the adjacent iron core laminates decrease in size so that an amount of the resin leaking into the gaps is reduced. As a result, by curing the resin in the magnet insertion holes while the laminated iron core is pressurized, a high quality magnet embedded core having a stable magnetic performance can be obtained owing to the minimization of the resin leaking into the gaps between the adjoining iron core laminates.

Patent Document 1: JP2014-79056A

SUMMARY OF THE INVENTION

Task to be Accomplished by the Invention

However, if the resin in the magnet insertion holes is cured while the laminated iron core is deformed in the laminating direction, once the laminated iron core is released from the die assembly, the gaps are kept closed in areas adjoining the magnet insertion holes owing to the bonding action by the cured resin, but the gaps in areas remote from the magnet insertion holes may expand back to the original state owing to the lack of bonding action by the resin.

This phenomenon becomes more pronounced as the magnitude of the pressurizing force (clamping force) acting on the laminated iron core in the laminating direction during the clamping increases owing to the corresponding increase in the deformation of the laminated iron core in the laminating direction at the time of clamping. Therefore, when the resin is cured while an excessive pressurizing force is applied to the laminated iron core, the planarity of the end surfaces of the laminated iron core may be impaired. Also, the stacking height may vary from one laminated iron core to another to such an extent that some difficulty may be encountered in obtaining high quality magnet embedded cores having a high geometric and dimensional precision in a stable manner.

Furthermore, owing to the tendency of the laminated iron core to regain the original state following the releasing of the clamping force, some stress may be created in the laminated iron core and in the resin that has been cured in the magnet insertion holes. This stress becomes greater as the magnitude of the pressurizing force during the clamping increases owing to the corresponding increase in the deformation of the laminated iron core in the laminating direction at the time of clamping. Therefore, when the resin is cured while an excessive pressurizing force is applied to the laminated iron core by the clamping, the resin in the magnet insertion holes may peel off and/or crack with the result that a high quality magnet embedded core may not be obtained in a reliable manner.

The die clamping device used for a resin sealing device may consist of a toggle die clamping device which is economical and capable of producing a stable clamping force over an extended period of time. However, generally available toggle die clamping devices are provided with rated clamping forces in the order of several tens of tons, and such a range of clamping force may result in an excessive pressurizing force applied to laminated iron cores.

A primary task of the present invention is to manufacture a high quality magnet embedded core in a stable manner even when a die clamping device of a large rated clamping force is used by preventing an excessive pressurizing force from being applied to the laminated iron core and performing the clamping with an appropriate pressurizing force so that the leakage of the resin out of the magnet insertion holes can be minimized, and the reduction in the geometric and dimensional precision of the laminated iron core may be suppressed.

Means to Accomplish the Task

The present invention provides a resin sealing device for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, the resin sealing device comprising: a fixed platen; a moveable platen placed opposite to the fixed platen so as to be moveable in a direction toward and away from the fixed platen; a die clamping device configured to drive the moveable platen in the direction toward and away from the fixed platen; a fixed die attached to the fixed platen; and a moveable die attached to the moveable platen, wherein one of the fixed die and the moveable die is configured to place the laminated iron core thereon, and the other of the fixed die and the moveable die is configured to abut onto the end surface of the laminated iron core upon clamping by the die clamping device to close the openings of the magnet insertion holes and pressurize the laminated iron core in a laminating direction, the resin sealing device further comprising an elastic member positioned between the fixed die or the fixed platen and the moveable die or the moveable platen to urge the fixed die and the moveable die away from each other.

According to this arrangement, because the fixed die and the moveable die are urged in a direction away from each other, the pressurizing force applied to the laminated iron core by the die clamping device is reduced by an amount equal to this urging force. Therefore, even when a die clamping device having a large rated clamping force such as a toggle die clamping device is used, an excessive pressurizing force is prevented from being applied to the laminated iron core, and owing to the clamping with an appropriate pressurizing force, the leakage of the resin out of the magnet insertion holes is suppressed, and the reduction in the geometric and dimensional precision of the laminated iron core is suppressed so that a high quality magnet embedded core can be manufactured in a stable manner.

The die clamping device to be used here may comprise a toggle link that provides a stable clamping force over an extended period of time in an economical way. The elastic member used here may preferably consist of a compression coil spring, a rubber member or any other elastic member that can produce a stable elastic force over an extended period of time.

In the resin sealing device for manufacturing a magnet embedded core according to the present invention, preferably, the elastic member comprises a plurality of elastic members configured to be positioned radially outside of the laminated iron core around a center of the laminated iron core.

According to this arrangement, the reduction or cancelling of the clamping force by the urging force of the elastic members takes place in radially outside parts of the laminated iron core around the center of the laminate iron core, and therefore, the laminated iron core is protected from undue stress.

In the resin sealing device for manufacturing a magnet embedded core according to the present invention, preferably, the elastic member comprises a plurality of elastic members configured to be positioned around a center of the laminated iron core at a regular interval.

According to this arrangement, the reduction or cancelling of the clamping force by the urging force of the elastic members takes place in parts of the laminated iron core around the center thereof in an even manner, and therefore, the laminated iron core is protected from undue stress that can be otherwise caused by the urging force of the elastic members.

Preferably, the resin sealing device for manufacturing a magnet embedded core according to the present invention further comprises: a tubular member having an axial direction coinciding with the direction toward and away from the fixed platen and projecting from one of the moveable die or the moveable platen and the fixed die or the fixed platen toward the other; and a moveable member provided on the tubular member so as to be moveable in the axial direction relative to the tubular member, wherein the elastic member comprises a compression coil spring positioned in the tubular member to urge the moveable member toward the other of the moveable die or the moveable platen and the fixed die or the fixed platen, and the moveable member includes a tip end portion configured to abut the fixed die during a movement of the moveable die toward the fixed die.

According to this arrangement, the elastic member is allowed to deform in an appropriate manner owing to a guiding action of the tubular member, and the moveable member abuts the fixed die during a movement of the moveable die toward the fixed die so that a relatively short compression coil spring can be used without regard to the opening stroke of the moveable die. In particular, the compression coil spring is prevented from bending because the compression coil spring is positioned in the tubular member.

The present invention also provides a resin sealing method for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, wherein the resin sealing method uses a resin sealing device including a fixed platen, a moveable platen placed opposite to the fixed platen so as to be moveable in a direction toward and away from the fixed platen, a die clamping device configured to drive the moveable platen in the direction toward and away from the fixed platen, a fixed die attached to the fixed platen, and a moveable die attached to the moveable platen, the method comprising: an iron core positioning step of positioning the laminated iron core on one of the fixed die and the moveable die; a resin charging step of charging the resin into the magnet insertion holes; a magnet piece insertion step of inserting the magnet pieces in the respective magnet insertion holes; and a pressurizing step of causing, by use of the die clamping device, the other of the fixed die and the moveable die to abut onto the end surface of the laminated iron core to close the openings of the magnet insertion holes and pressurize the laminated iron core in a laminating direction with the other of the fixed die and the moveable die, wherein during the pressurizing step, a pressurizing force acting on the laminated core in a clamped state provided by the die clamping device is reduced by an urging force of an elastic member interposed between the moveable die and the fixed die to urge the fixed die and the moveable die in a direction away from each other.

According to this method, because the fixed die and the moveable die are urged in a direction away from each other, the pressurizing force applied to the laminated iron core by the die clamping device is reduced by an amount equal to this urging force, and hence, an excessive pressurizing force is prevented from being applied to the laminate iron core during the clamping. Therefore, even when a die clamping device having a large rated clamping force such as a toggle die clamping device is used, an excessive pressurizing force is prevented from being applied to the laminated iron core, and owing to the clamping with an appropriate pressurizing force, the leakage of the resin out of the magnet insertion holes is suppressed, and the reduction in the geometric and dimensional precision of the laminated iron core is suppressed so that a high quality magnet embedded core can be manufactured in a stable manner.

In a preferred embodiment of the resin sealing method for manufacturing a magnet embedded core according to the present invention, the resin charging step includes a step of charging the resin in solid state into the magnet insertion holes, the method further comprises a melting step of melting the resin in solid state in the magnet insertion holes, and a curing step of curing the resin in molten state in the pressurizing step.

According to this method, as compared to the case where the molten resin is injected into the magnet insertion holes under pressure via runners and gates formed in the die assembly as an injection molding process, the resin which would remain in the runners and the gates can be saved so that the material cost can be reduced with the added advantage of facilitating the maintenance of the die assembly.

The present invention further provides a resin sealing method for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, the resin sealing method comprising: a resin charging step of charging the resin in solid state into the magnet insertion holes; a magnet piece insertion step of inserting the magnet pieces in the respective magnet insertion holes; a melting step of melting the resin in solid state in the magnet insertion holes; and a curing step of curing the resin in molten state.

According to this method, as compared to the case where the molten resin is injected into the magnet insertion holes under pressure via runners and gates formed in the die assembly as an injection molding process, the resin which would remain in the runners and the gates can be saved so that the material cost can be reduced with the added advantage of facilitating the maintenance of the die assembly.

In a preferred embodiment of the resin sealing method for manufacturing a magnet embedded core according to the present invention, the curing step comprises a resin pressurizing step of pressurizing the resin in molten state.

According to this method, air bubbles that may remain in the resin can be expelled or compressed so that the magnet pieces can be sealed in a reliable manner with the resin having few voids therein.

In a preferred embodiment of the resin sealing method for manufacturing a magnet embedded core according to the present invention, the curing step comprises an iron core pressurizing step of pressurizing the laminated iron core in a laminating direction.

According to this method, the manufactured laminated iron core is given with a high magnetic performance by having little leakage of resin into the gaps between the adjacent iron core laminates.

In a preferred embodiment of the resin sealing method for manufacturing a magnet embedded core according to the present invention, the curing step comprises a resin pressurizing step of pressurizing the resin in molten state, and an iron core pressurizing step of pressurizing the laminated iron core in a laminating direction, the resin pressurizing step and the iron core pressurizing step being performed by using a resin sealing device including a die clamping device.

According to this method, the pressurizing of the resin and the pressurizing of the laminated iron core can be performed in an appropriate manner over an extended period of time.

In a preferred embodiment of the resin sealing method for manufacturing a magnet embedded core according to the present invention, the resin charging step is performed in a location different from the resin sealing device.

According to this method, the work time of the resin sealing device can be reduced so that the operation efficiency of the resin sealing device can be improved.

In a preferred embodiment of the resin sealing method for manufacturing a magnet embedded core according to the present invention, the magnet piece insertion step is performed in a location different from the resin sealing device.

According to this method, the work time of the resin sealing device can be reduced so that the operation efficiency of the resin sealing device can be improved.

In a preferred embodiment of the resin sealing method for manufacturing a magnet embedded core according to the present invention, the resin consists of a thermosetting resin, and the laminated iron core is heated in the melting step and the curing step.

According to this method, the melting of the thermosetting resin in solid state in the melting step and the irreversible curing of the thermosetting resin in the curing step can be performed by using the heat of the laminated iron core in a heat efficient manner.

In a preferred embodiment of the resin sealing method for manufacturing a magnet embedded core according to the present invention, the resin consists of a thermosetting resin, and the melting step includes melting the resin in solid state at least partly by the laminated iron core preheated prior to the resin charging step.

According to this method, the time required to heat the laminated iron core to a temperature required to melt the thermosetting resin in solid state in the melting step can be reduced.

In a preferred embodiment of the resin sealing method for manufacturing a magnet embedded core according to the present invention, the resin consists of a thermosetting resin, and the melting step includes melting the resin in solid state at least partly by the laminated iron core preheated in a location different from the resin sealing device such as a heating oven.

According to this method, the work time of the resin sealing device can be reduced so that the operation efficiency of the resin sealing device can be improved.

In a preferred embodiment of the resin sealing method for manufacturing a magnet embedded core according to the present invention, the resin in solid state is formed by molding uncured material resin in powder or granular form into a prescribed shape.

According to this method, the amount of the resin to be charged into the magnet insertion holes can be correctly set without any excess or shortage beforehand so that the handling of the resin can be improved, and the charging step can be performed in an efficient manner.

In a preferred embodiment of the resin sealing method for manufacturing a magnet embedded core according to the present invention, at least one of outer surfaces of the resin in solid state is placed in contact with an inner surface of the laminated iron core defining the magnet insertion hole.

According to this method, the heat transfer from the laminated iron core to the resin in solid state can be performed in an efficient manner so that the time required to melt the thermosetting resin in solid date can be reduced.

In a preferred embodiment of the resin sealing method for manufacturing a magnet embedded core according to the present invention, the resin in solid state is in uncured, granular form.

According to this method, the resin can be charged into the magnet insertion holes with ease without regard to the shape of the magnet insertion holes and the amount of the resin to be charged into each magnet insertion hole.

Effects of the Invention

According to the resin sealing device and the resin sealing method for manufacturing a magnet embedded core of the present invention, even when a die clamping device having a large rated clamping force is used, an excessive pressurizing force is prevented from being applied to the laminated iron core, and the clamping is performed with an appropriate pressurizing force so that the leakage of the resin out of the magnet insertion holes can be minimized, and the reduction in the geometric and dimensional precision of the laminated iron core can be suppressed, whereby a high quality magnet embedded core can be manufactured in a stable manner.

BRIEF DESCRIPTION OF THE DRAWING(S)

EMBODIMENT(S) FOR CARRYING OUT THE INVENTION

Preferred embodiments of the present invention are described in the following with reference to the appended drawings.

Figure 1:
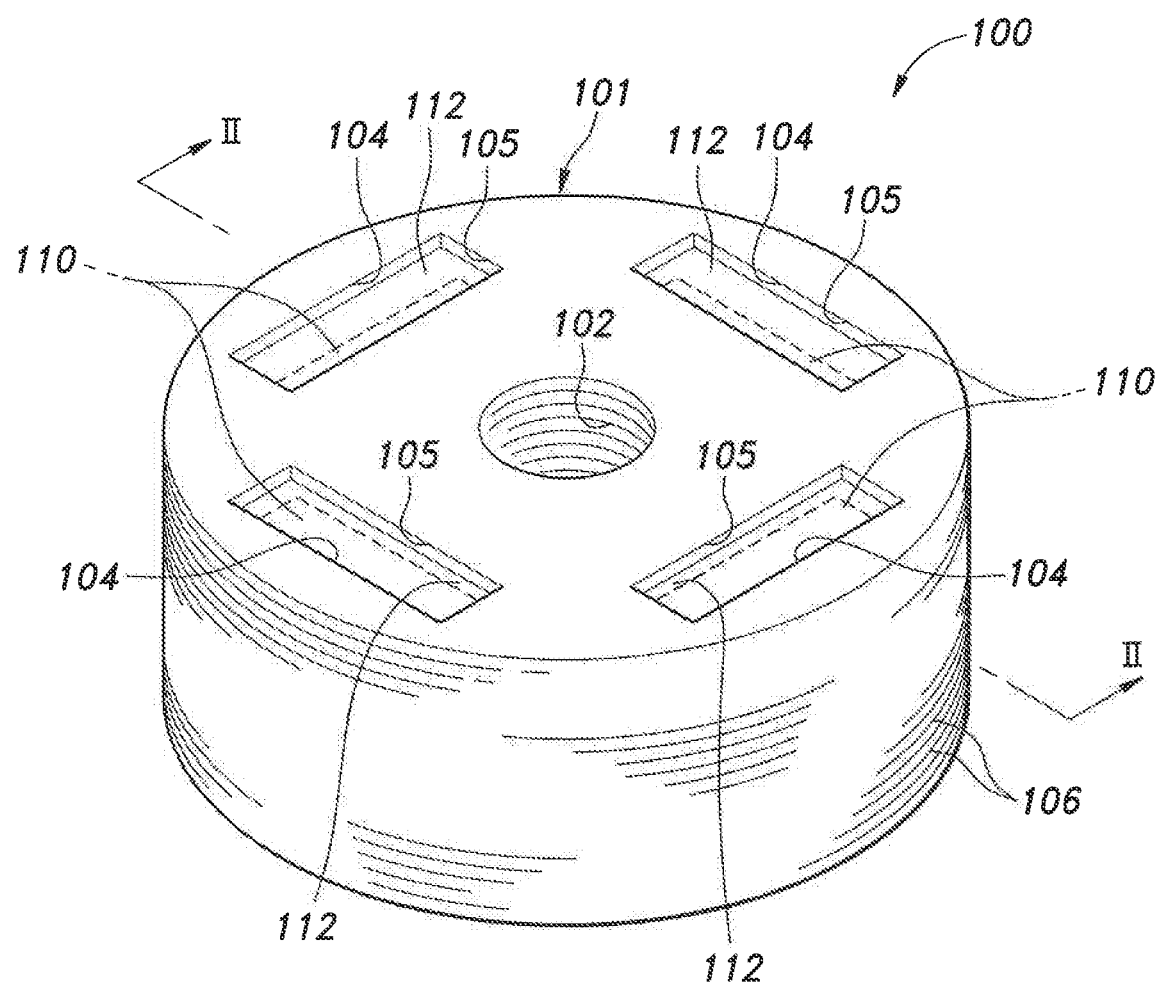
FIG. 1 is a perspective view of an example of a magnet embedded core manufactured by a resin sealing method according to the present invention.
Figure 2:
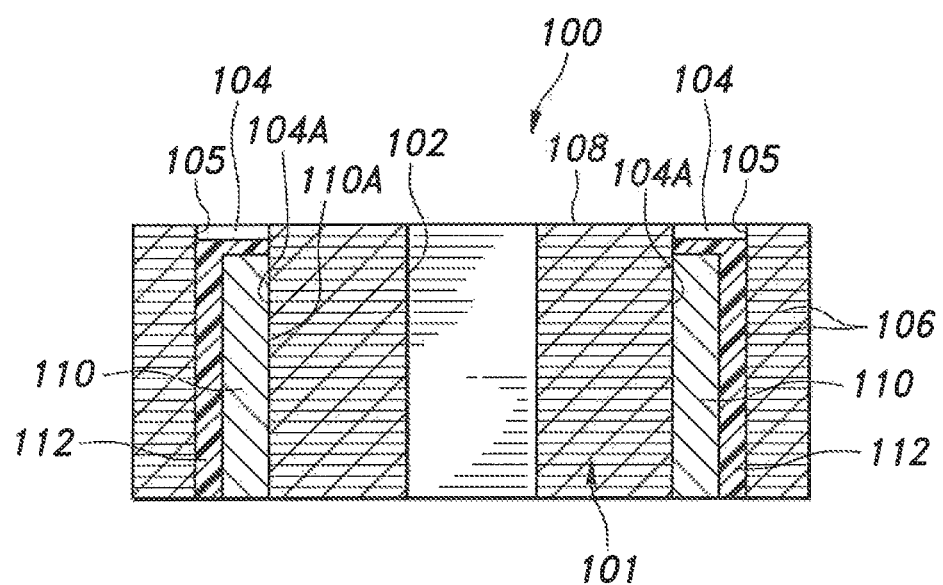
FIG. 2 is a sectional view taken along line II-II of FIG. 1.

First of all, an example of a magnet embedded core manufactured by a resin sealing method according to the present invention is described in the following with reference to FIGS. 1 and 2.

The magnet embedded core 100 has a laminated iron core 101 including a plurality of magnet insertion holes 104, and magnet pieces 110 positioned in the respective magnet insertion holes 104. The laminated iron core 101 is formed by stacking a plurality of iron core laminates 106 each formed by punching and consisting of a disk formed with openings for defining a center hole 102 and the magnet insertion holes 104.

The magnet insertion holes 104 are arranged circumferentially around the center hole 102 at a regular interval, and are each provided with a substantially rectangular shape in plan view (shape of cross section). Each magnet insertion hole 104 extends axially through the laminated iron core 101 in a laminating direction (axial direction), and defines a substantially rectangular space having an upper opening 105 at an upper end surface 108 of the laminated iron core 101. Each magnet insertion hole 104 is passed axially through the laminated iron core 101 in the illustrated embodiment, but may also be provided with a closed bottom by omitting the opening for defining the magnet insertion hole 104 in the lowermost iron core laminate 106.

Each magnet piece 110 has a substantially rectangular parallelepiped shape, and is fixed in position relative to the laminated iron core 101 by resin 112 charged into (filling) the magnet insertion hole 104. The resin 112 may consist of a thermosetting resin such as epoxy resin that can be irreversibly cured by being heated to a temperature higher than a prescribed curing temperature.

Each magnet piece 110 may consist of, for example, a ferrite-based sintered magnet or a permanent magnet (with or without magnetization) such as a neodymium magnet. The axial length of each magnet piece 110 is slightly smaller than the axial length of the magnet insertion hole 104, and the end surface (in this case, the upper surface) of the magnet piece 110 is covered by the resin 112.

The magnet piece 110 in each magnet insertion hole 104 is inwardly offset (or offset toward the center of the laminated iron core 101) so that the outer surface 110A of the magnet piece 110 on the inner side thereof makes a surface contact with (abuts against) the inner surface 104A of the magnet insertion hole 104 on the inner side thereof. In the drawings, for the convenience of description, the clearance between each surface defining the magnet insertion hole 104 (excluding the inner surface 104A) and the corresponding side surface of the magnet piece 110 (excluding the outer surface 110A) is shown greater than the practical size.

A resin sealing device 1 for the magnet embedded core of the illustrated embodiment is described in the following with reference to FIGS. 3 to 8.

The resin sealing device 1 includes a lower fixed platen 10 and an upper fixed platen 12 which are vertically spaced from each other. The lower fixed platen 10 and the upper fixed platen 12 are connected to each other by a plurality of tie bars 14 so as to be parallel to each other. A moveable platen 16 is provided between the lower fixed platen and the upper fixed platen 12 so as to be moveable toward and away from the lower fixed platen 10 or in the vertical direction by being guided by the tie bars 14. The lower fixed platen 10, the upper fixed platen 12, and the moveable platen 16 thus squarely oppose one another.

A lower die 18 forming a fixed die is attached to the upper surface 11 of the lower fixed platen 10. An upper die 20 forming a moveable die is attached to the lower surface 17 of the moveable platen 16.

The lower die 18 consists of a flat plate that has an upper surface 19 supporting a conveying tray 21. A plurality of such conveying trays 21 are allocated for each resin sealing device 1, and a plurality of laminated iron cores 101 are placed on the respective conveying trays 21 in advance in a location outside of the resin sealing device 1 (or a location different from the resin sealing device 1). By conveying the conveying trays 21 each supporting a laminated iron core 101 to the prescribed position on the lower die 18 in a sequential manner, the operation efficiency of the resin sealing device 1 can be improved. Each laminated iron core 101 is correctly positioned on the corresponding conveying tray 21 with the aid of a positioning member (not shown in the drawings) provided on the conveying tray 21.

A cylindrical heating device 70 for thermally curing the resin 112 charged into the magnet insertion holes 104 is detachably arranged on the outer periphery of the laminated iron core 101. The heating device 70 may consist of a high-frequency induction heating device provided with a coil (not shown in the drawings) for induction heating the laminated iron core 101, for instance.

The upper die 20 is provided with a substantially flat lower surface 22 which opposes a substantially flat upper end surface 108 of the laminated iron core 101 placed on the lower die 18 so that the laminated iron core 101 can be pressurized in the laminating direction (in the downward direction). The lower surface 22 is provided with pressurization projections 24 in parts thereof aligning with the respective magnet insertion holes 104 so as to close the upper openings 105 of the corresponding magnet insertion holes 104, and pressurize the resin 112 in the magnet insertion holes 104. Each pressurization projection 24 is provided with a rectangular shape in plan view which is conformal to the shape of the magnet insertion hole 104 in plan view. The pressurization projections 24 may also consist of members separate from the upper die and be resiliently supported by springs or the like so as to be vertically moveable relative to the upper die 20.

A die clamping device 30 including a toggle link mechanism 42 is provided between the upper fixed platen 12 and the moveable platen 16. The toggle link mechanism 42 is configured to drive the moveable platen 16 toward and away from the lower fixed platen 10 (in the vertical direction), and includes an upper link 34 having one end pivotally connected to a lower part of the upper fixed platen 12 via a pivot shaft 32, and a lower link 38 having one end pivotally connected to an upper part of the moveable platen 16 via a pivot shaft 36. The other ends of the upper link 34 and the lower link 38 are pivotally connected to each other via a pivot shaft 40.

The die clamping device 30 includes a hydraulic cylinder device 46 for driving the toggle link mechanism 42. The hydraulic cylinder device 46 includes a cylinder tube 47 having a base end pivotally connected to a fixed frame 3 of the resin sealing device 1 via a pivot shaft 44 and a piston rod 48 projecting outwardly from a free end of the cylinder tube 47. A tip end of the piston rod 48 is pivotally connected to the other ends of the upper link 34 and the lower link 38 via the pivot shaft 40.

Figure 3:
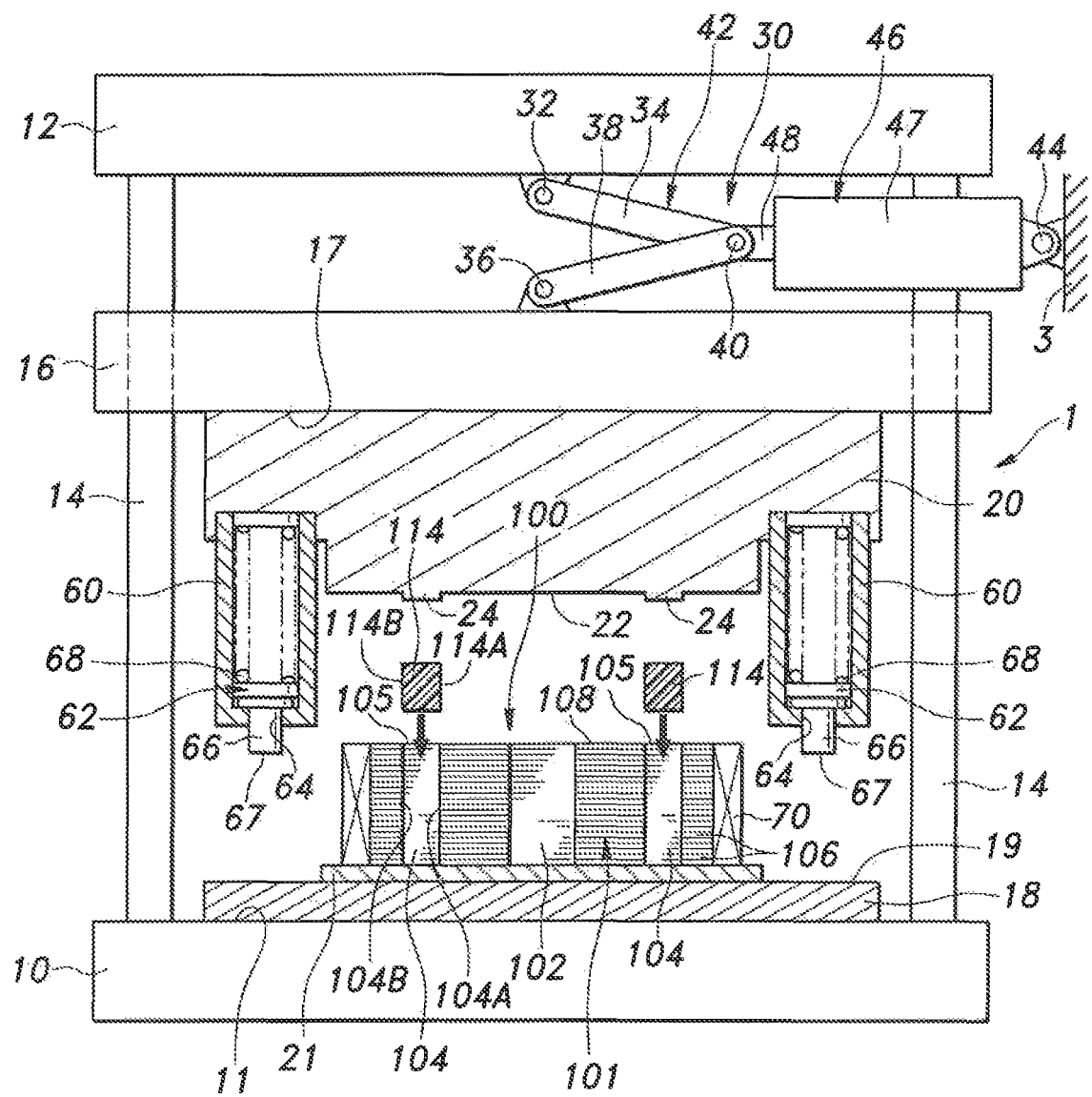
FIG. 3 is a front view of a resin sealing device for the magnet embedded core in a resin charging step partly in section according to an embodiment of the present invention.
Figure 8:
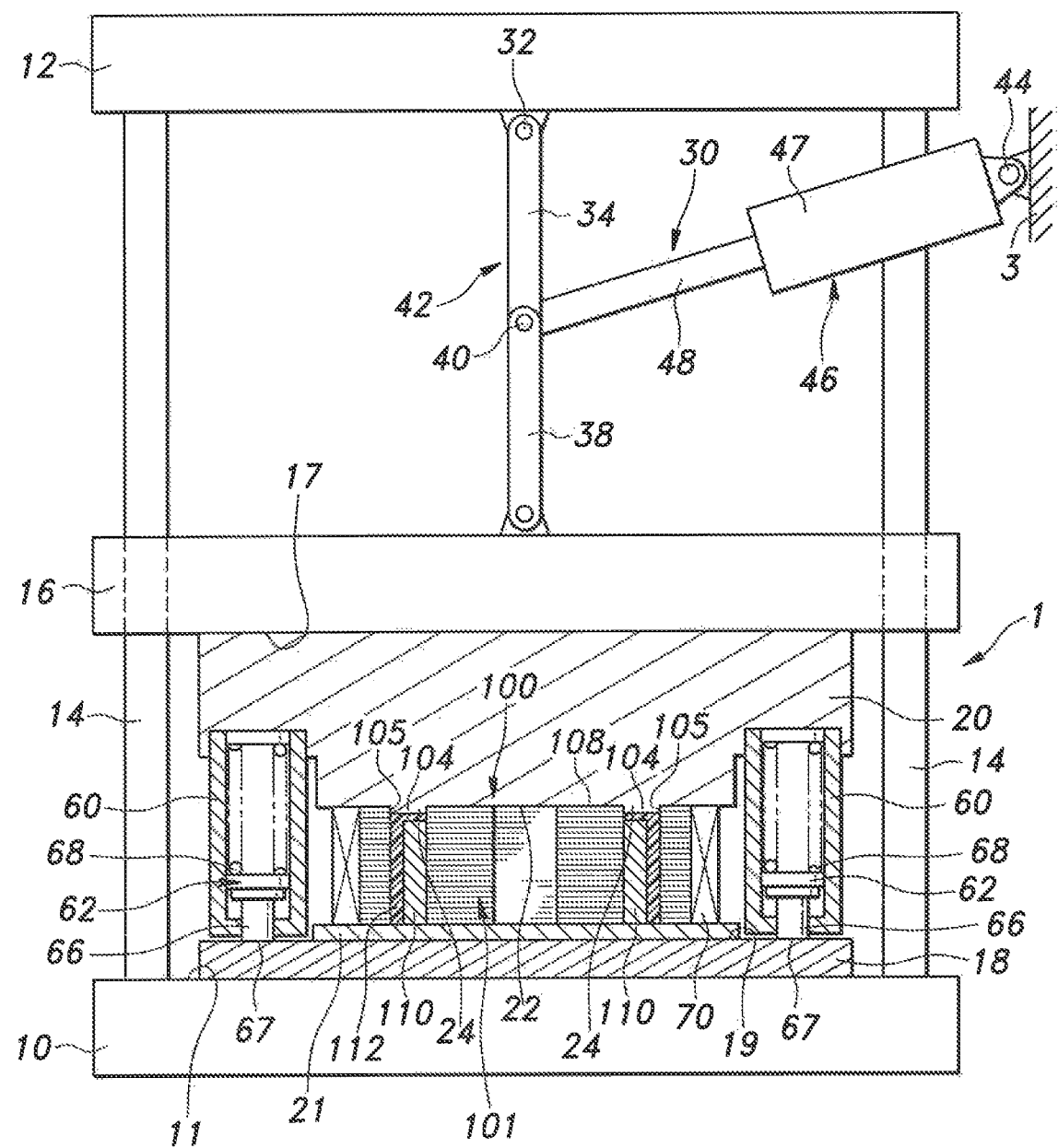
FIG. 8 is a front view of the resin sealing device partly in section at a completion of the clamping of the die assembly.

When the piston rod 48 has retreated and the toggle link mechanism 42 is in the maximally folded state as shown in FIG. 3, the die clamping device 30 causes the moveable platen 16 to be positioned at the uppermost position (die open condition). When the piston rod 48 has advanced and the toggle link mechanism 42 is in the maximally extended state as shown in FIG. 8, the die clamping device 30 causes the moveable platen 16 to be positioned at the lowermost position (die closed position). In the maximally folded state shown in FIG. 3, the angle formed between the upper link 34 and the lower link 38 is minimized. In the maximally extended state shown in FIG. 8, the upper link 34 and the lower link 38 extend along a vertical straight line (angle formed between the upper link 34 and the lower link 38=180 degrees). The maximally extended state can be detected by measuring the position of the moveable platen 16 with a linear sensor (not shown) or any other per se known method.

In the maximally extended state shown in FIG. 8, the upper die 20 is located at the lowermost position together with the moveable platen 16, and the lower surface 22 of the upper die 20 is in surface contact with the upper end surface 108 of the laminated iron core 101 placed on the lower die 18 so that the laminated iron core 101 is pressurized in the laminating direction, and the pressurization projections 24 engage the respective magnet insertion holes 104 to close the upper openings 105 thereof and pressurize the resin 112 in the respective magnet insertion holes 104. This state is referred to as a clamped state.

A plurality of tubular members 60 each having a bottomed cylindrical shape and an axial direction coinciding in a vertical direction are fixed to the upper die 20 at upper ends thereof, and extend from the upper die 20 toward the lower die 18. The tubular members 60 are positioned radially outside of the laminated iron core 101 around the center of the laminated iron core 101 and at a regular interval around the center of the laminated iron core 101, with the laminated iron core 101 being positioned on the prescribed position of the lower die 18 via the conveying tray 21. Each tubular member 60 receives a moveable member 62 in a vertically slidable manner. Each moveable member 62 is integrally provided with a tip end portion 66 that projects out of the corresponding tubular member 60 via a through hole 64 formed in the bottom wall (lower end) of the tubular member 60. A tip end surface 67 of each tip end portion 66 squarely opposes the upper surface 19 of the lower die 18.

In each tubular member 60, a compression coil spring 68 is provided between the upper die 20 and the moveable member 62. Each compression coil spring 68 urges the corresponding moveable member 62 toward the bottom end of the tubular member 60 or, in other words, toward the side of the lower die 18. The urging forces applied to the moveable members 62 by the compression coil springs 68 in the respective tubular members 60 may be equal to one another.

Figure 7:
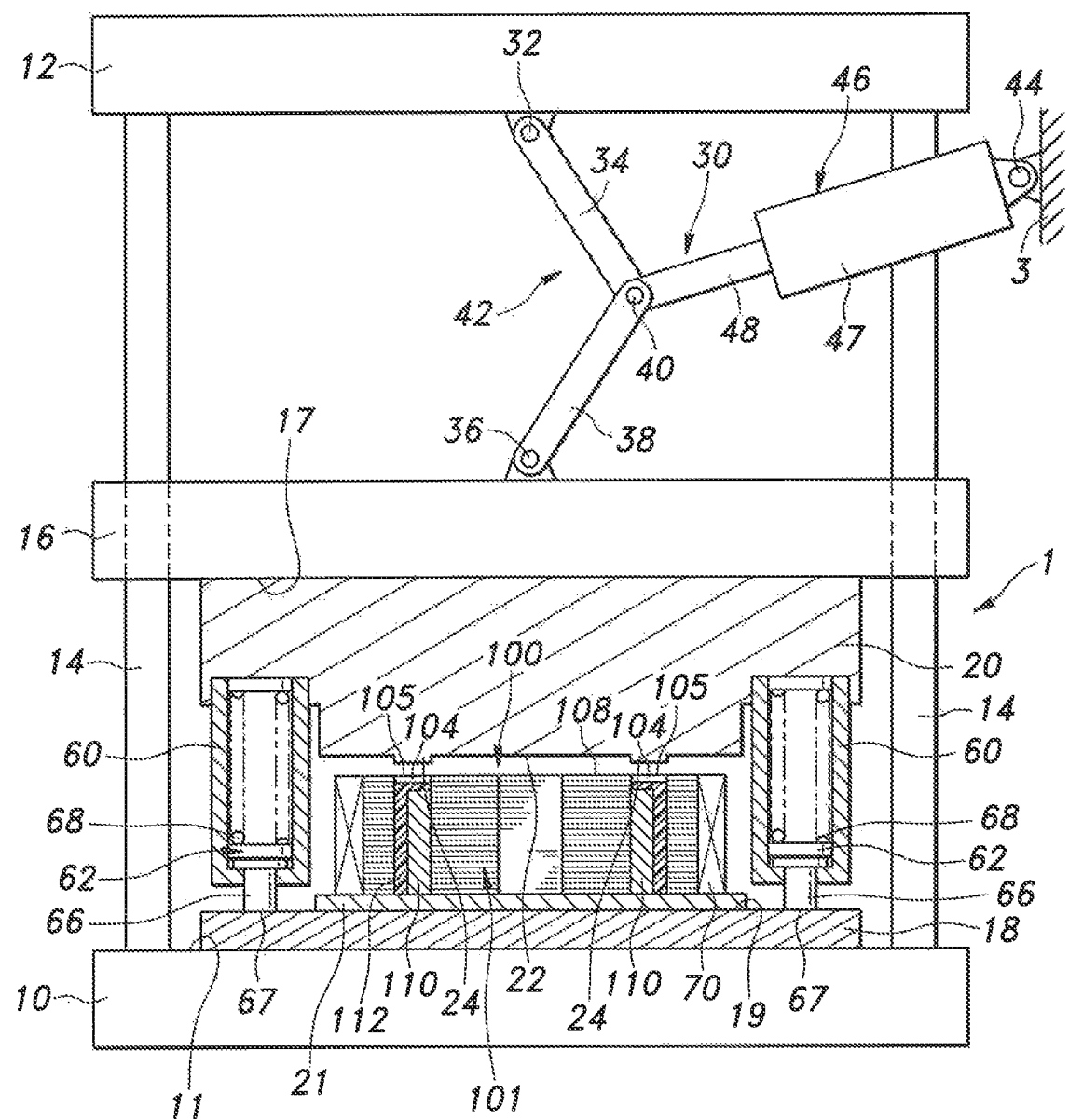
FIG. 7 is a front view of the resin sealing device partly in section immediately before a completion of a clamping of a die assembly.

The tip end surfaces 67 of the moveable members 62 are positioned (by appropriately dimensioning the associated component parts) so as to simultaneously come into contact with the upper surface 19 of the lower die 18 as the upper die 20 approaches the lower die 18 or, more specifically, as the upper die 20 has descended to a point slightly short of a position where the lower surface 22 of the upper die 20 comes into surface contact with the upper end surface 108 of the laminated iron core 101, as shown in FIG. 7.

The process of sealing the magnet pieces 110 inserted in the respective magnet insertion holes 104 with the resin 112 is described in the following with reference to FIGS. 3 to 8.

First of all, as an iron core positioning step, in a die open condition where the moveable platen 16 is at the uppermost position, and the upper die 20 is displaced furthest away from the lower die 18 as shown in FIG. 3, a laminated iron core 101 together with the conveying tray 21 is placed in (or conveyed to) a prescribed position on the lower die 18.

Thereafter, as a resin charging step, a solid resin block 114 is charged into each magnet insertion hole 104 from the upper opening 105 thereof. The resin blocks 114 are formed by preliminarily molding uncured material resin (which may be the same as the resin 112) in powder or granular form into a rectangular brick shape conforming to the shape of the magnet insertion hole 104, and are positioned in the bottom parts of the respective magnet insertion holes 104. The resin blocks 114 are simultaneously heated in the respective magnet insertion holes 104 by the heat from the laminated iron core 101 which is in turn heated by the heating device 70.

The laminated iron core 101 may also be preheated by the heating device 70 or an oven (not shown in the drawings) or the like in a position different from the resin sealing device 1 prior to placing the laminated iron core 101 in the resin sealing device 1. Thereby, the time required for heating the resin block 114 to a temperature required to melt the resin block 114 in a melting step which will be described hereinafter can be reduced. Also, the resin charging step may also be performed in a location different from the resin sealing device 1 before placing the laminated iron core 101. Such measures contribute to a reduction in the work time of the resin sealing device 1, and an improvement in the operation efficiency of the resin sealing device 1.

Each resin block 114 has at least one outer surface, or outer surfaces 114A and 114B in the illustrated embodiment which are in surface contact with the inner surfaces 104A and 104B of the corresponding magnet insertion hole 104, respectively. As a result, the heat transfer from the laminated iron core 101 to the resin block 114 is efficiently performed as compared to the case where a gap is created between the two so that the heating of the resin block 114 in each magnet insertion hole 104 can be performed rapidly and in a thermally efficient manner.

Figure 4:
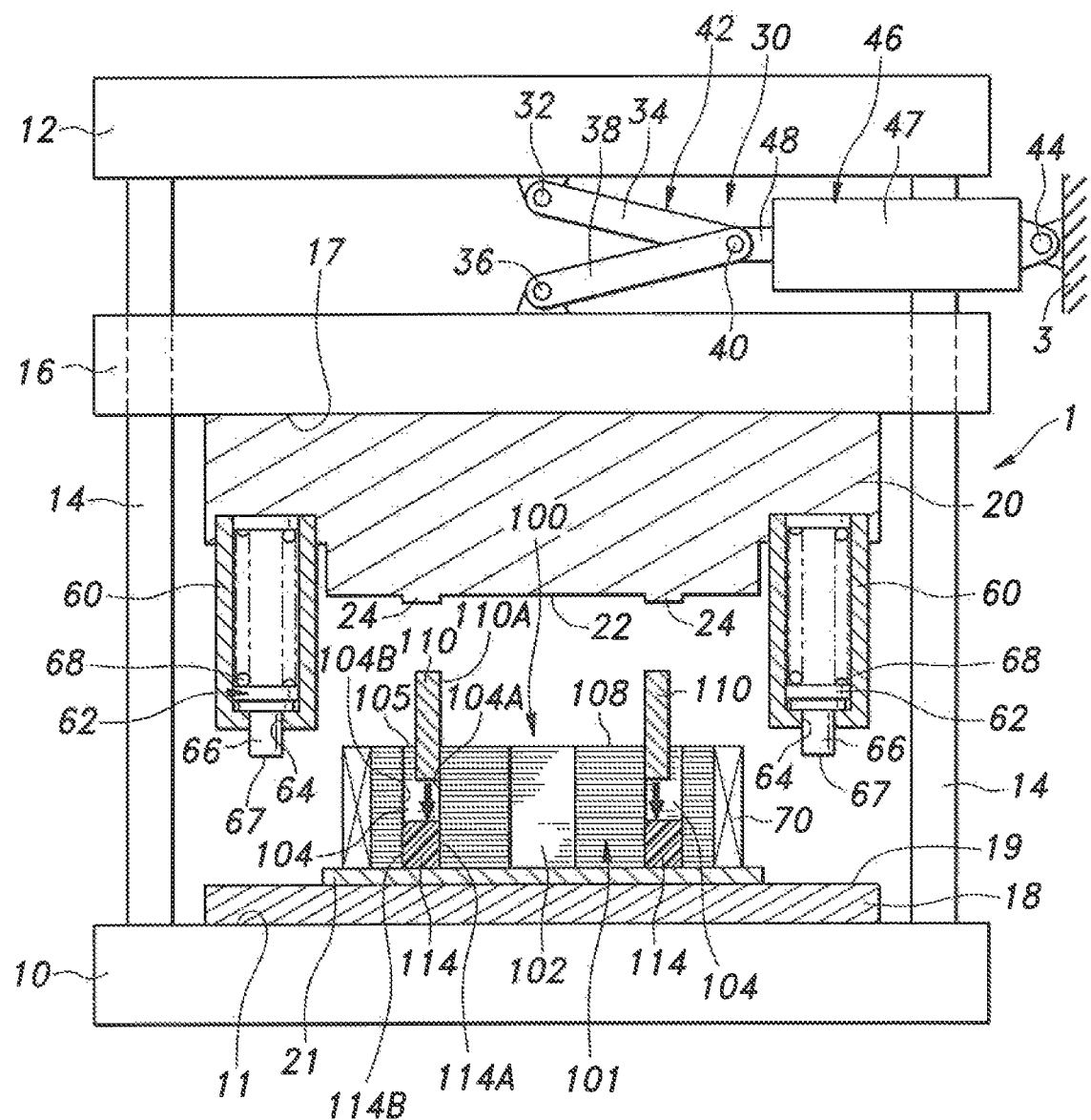
FIG. 4 is a front view of the resin sealing device partly in section in a magnet piece insertion step.
Figure 5:
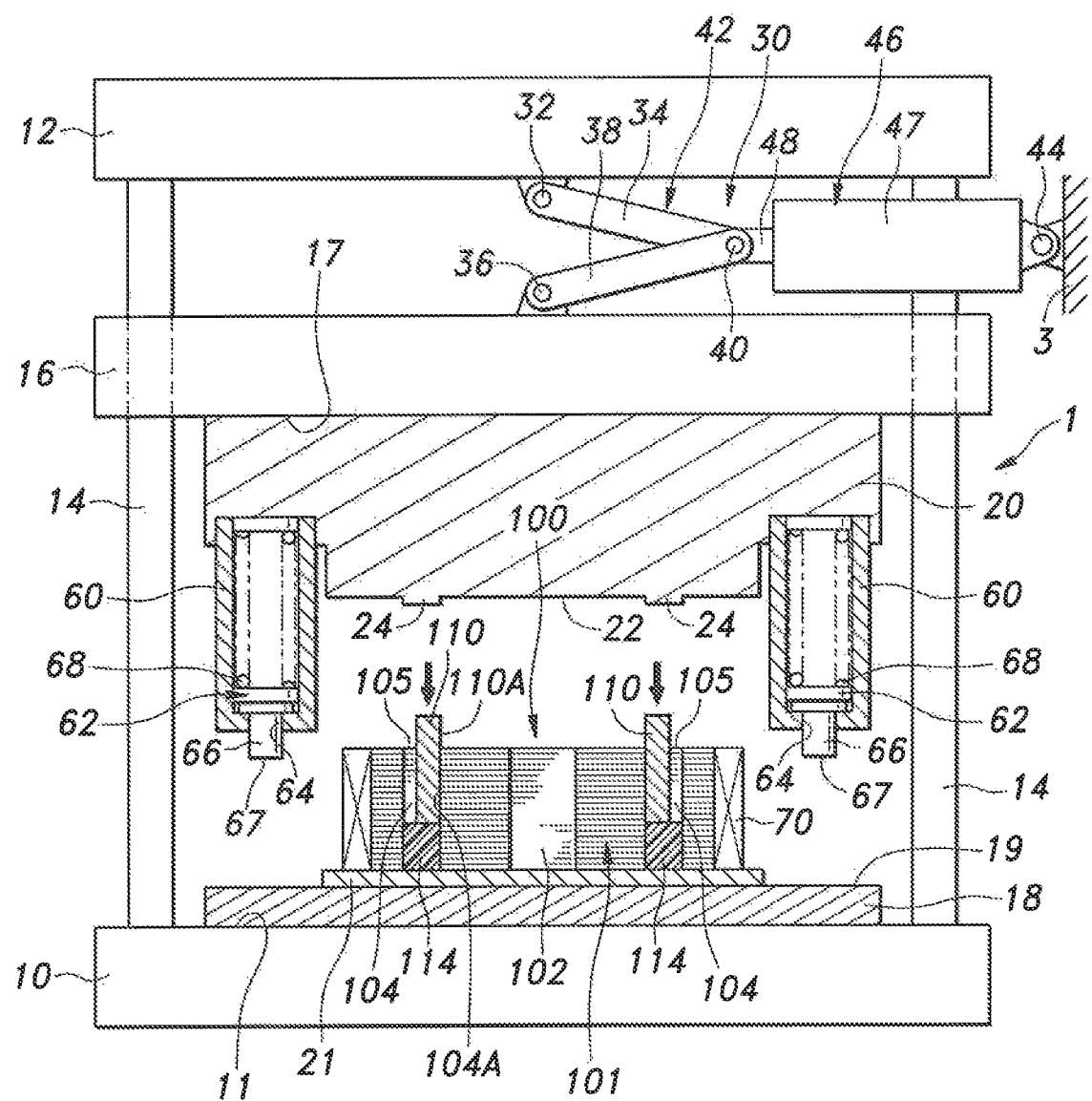
FIG. 5 is a front view of the resin sealing device partly in section at a completion of the magnet piece insertion step.

Subsequently, as a magnet piece insertion step, in the die open condition, magnet pieces 110 are charged into the respective magnet insertion holes 104 from the upper openings 105 thereof as shown in FIG. 4. This is performed in such a manner that one of the outer surfaces 110A of each magnet piece 110 is brought into contact with the inner surface 104A of the magnet insertion hole 104 on the side of the center hole 102, and the lower end surface of the magnet piece 110 is brought into contact with the upper surface of the resin block 114 received in the magnet insertion hole 104 as shown in FIG. 5.

The magnet piece insertion step may also be performed in a location different from the resin sealing device 1 prior to the placing of the laminated iron core 101 on the resin sealing device 1. Such a measure contributes to the reduction in the work time of the resin sealing device 1, and the improvement in the operation efficiency of the resin sealing device 1.

Thereafter, as a melting step, the resin block 114 is heated by the heat of the laminated iron core 101, and is thereby melted. Melting of the resin block 114 means that the material resin forming the resin block 114 is caused to acquire a fluidity by turning into liquid or by softening.

In this melting step, the magnet pieces 110 that are charged into the magnet insertion holes 104 may be preheated by a heating oven (not shown in the drawings) or the like to a prescribed temperature. In such a case, because the resin blocks 114 in the magnet insertion holes 104 are heated not only by the heat of the laminated iron core 101 which has been heated by the heating device 70 but also directly by the heat of the magnet pieces 110, the time required to melt the resin blocks 114 in the melting step can be reduced, and the work efficiency of resin sealing can be improved.

By pushing the magnet piece 110 toward the bottom of the magnet insertion hole 104 while the resin block 114 is in molten state, the liquid level of the molten resin 112 (see FIG. 6) is caused to gradually rise in the magnet insertion hole 104.

Because the resin blocks 114 in the magnet insertion holes 104 are heated not only by the heat of the laminated iron core 101 which has been heated by the heating device 70 but also directly by the heat of the magnet pieces 110 as discussed above, the time required to melt the resin blocks 114 in the melting step can be reduced, and the work efficiency of resin sealing can be improved.

Figure 6:
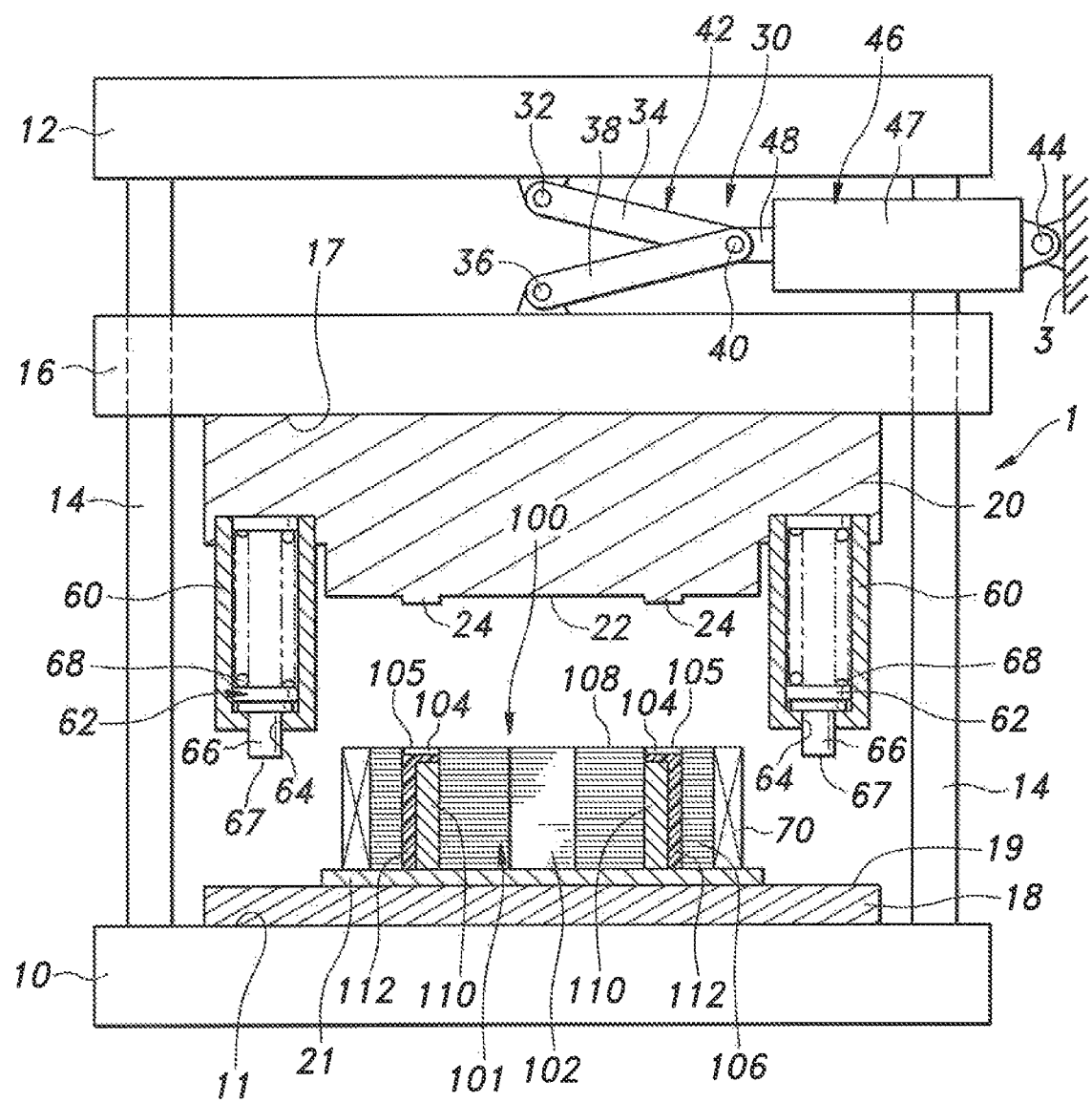
FIG. 6 is a front view of the resin sealing device partly in section in a resin melting step.

As shown in FIG. 6, when the magnet pieces 110 are each pushed fully into the prescribed placement position or to the bottom of the corresponding magnet insertion hole 104, the molten resin 112 fills the gap between the inner surface of the magnet insertion hole 104 remote from the center hole 102 and the corresponding outer side surface of the magnet piece 110, and the liquid level of the resin 112 rises above the upper surface of the magnet piece 110 until the upper surface of the magnet piece 110 is covered by the resin 112.

Next, the piston rod 48 is caused to move forward by supplying a hydraulic pressure to the hydraulic cylinder device 46. As the piston rod 48 advances, the angle formed by the upper link 34 and the lower link 38 increases, and the toggle link mechanism 42 becomes progressively extended so that the upper die 20 moves downward along with the moveable platen 16.

As shown in FIG. 7, when the upper die 20 has descended to a position where the lower surface 22 thereof is slightly short of the upper end surface 108 of the laminated iron core 101, the tip end surfaces 67 of the moveable members 62 abut on the upper surface 19 of the lower die 18 all at the same time.

As the toggle link mechanism 42 further extends, and the upper link 34 and the lower link 38 eventually extend in a straight line as shown in FIG. 8 (or, in other words, the toggle link mechanism 42 has fully extended), a die closed condition is accomplished where the lower surface 22 of the upper die 20 comes into surface contact with the upper end surface 108 of the laminated iron core 101 to pressurize the laminated iron core 101 in the laminating direction, and the pressurization projections 24 engage the corresponding magnet insertion holes 104 to close the upper openings 105 and to pressurize the resin 112 in the magnet insertion holes 104.

Once the die closed condition is accomplished, the gaps between adjacent iron core laminates 106 are reduced or eliminated so that leakage of the molten resin 112 into the gaps between the adjacent iron core laminates 106 is decreased or avoided.

While in this die closed condition, as a curing step, the resin 112 is continued to be heated by the laminated iron core 101 which has in turn been heated by the heating device 70 until the resin 112 chemically reacts, and cures irreversibly. Owing to the curing of the resin 112, the magnet pieces 110 are fixed and sealed in the respective magnet insertion holes 104, and the magnet embedded core 100 is completed. The completed magnet embedded core 100 is transported by the conveying tray 21 to the outside of the resin sealing device 1.

Since the curing of the resin 114 or the curing step is performed as an iron core pressurization step in the die closed condition in which the upper die 20 pressurizes the laminated iron core 101 and closes the upper openings 105, the magnet pieces 110 can be sealed with the resin 112 with very little or no resin leaking into the gaps between the adjoining iron core laminates 106. Thereby, a high quality magnet embedded core having a high magnetic performance can be obtained in a reliable manner.

Furthermore, since the curing step is performed while the resin 112 in the magnet insertion holes 104 is pressurized by the projections 24 as a resin pressurization step, air bubbles that may be remaining in the resin 112 are expelled or contracted in a favorable manner before the resin 112 is fully cured so that the magnet pieces 110 can be fixed and sealed in a reliable manner by the resin 112 having few voids therein.

As the resin 112 used for sealing the magnet pieces 110, the resin blocks 114 are charged into the respective magnet insertion holes 104. Therefore, as opposed to the injection molding process in which the molten resin is filled into the magnet insertion holes 104 under pressure via runners and gates formed in the die assembly, wastage of the resin remaining in the runners and the gates can be avoided, and the material cost is reduced. Also, by using the resin block 114, the amount of the resin block 114 to be charged into each magnet insertion hole 104 can be correctly set without any excess or shortage beforehand, and the handling of the material resin can be improved so that the work efficiency of the resin charging step can be improved.

As the upper die 20 descends from a state where the tip end surfaces 67 of the moveable members 62 are in contact with the upper surface 19 of the lower die 18 to the die closed condition, the upper die 20, along with the tubular members 60, descends relative to the moveable members 62 with the result that the compression coil springs 68 are compressed, and a spring force acts between the upper die 20 and the lower die 18 in the direction to urge upper die 20 and the lower die 18 away from each other.

As a result, in the maximum extended state of the toggle link mechanism 42, the pressurizing force acting on the laminated iron core 101 is reduced by the sum of the spring forces provided by the compressive deformation of the compression coil springs 68 so that the clamping force provided by the toggle link mechanism 42 is partially canceled, and the pressurizing force acting upon the laminated iron core 101 in the laminating direction is reduced from the rated clamping force provided by the toggle link mechanism 42 in the most extended state.

Therefore, even if an inexpensive general-purpose toggle type die clamping device 30 capable of producing a repeated stable clamping force (resin pressurizing force) of up to several tens of tons is used, an appropriate pressurizing force can be obtained in a stable manner without applying an excessive pressurizing force to the laminated iron core 101 when the die assembly is closed so that the laminated iron core 101 is prevented from being excessively deformed in the laminating direction. As a result, even though the resin 112 is cured in the clamped state, the planarity of the laminated iron core 101 is not impaired, and the height of the laminated iron core 101 is prevented from unduly varying, following the opening of the die assembly.

In addition, since the laminated iron core 101 is not deformed excessively in the laminating direction at the time of die clamping, no excessive stress is produced in the resin 112 which is cured in the magnet insertion holes 104 of the laminated iron core 101 when the die assembly is opened so that peeling and cracking of the resin 112 in the magnet insertion holes 104 can be avoided.

Thus, the leakage of the resin 112 to the outside of the magnet insertion holes 104 can be avoided, and the geometric precision and the dimensional precision of the laminated iron core 101 can be ensured at the same time. Therefore, the magnet embedded core 100 having a stable quality can be efficiently manufactured.

The actual pressurizing force that acts upon the laminated iron core 101 in the die closed condition where the toggle link mechanism 42 is maximally extended depends on the rated clamping force of the die clamping device 30, and the spring constant, the compressive deformation, the preload, etc. of the compression coil springs 68. Therefore, the actual pressurizing force that acts upon the laminated iron core 101 in the die closed condition of the laminated iron core 101 can be changed by adjusting the properties of the compression coil springs 68. In particular, even when the rated clamping force of the die clamping device 30 is fixed, the actual pressurizing force that acts upon the laminated iron core 101 in the die closed condition of the laminated iron core 101 can be changed freely by suitably selecting the spring properties of the compression coil springs 68.

The proper pressurizing force when sealing the magnet pieces 110 in the magnet embedded core 100 with the resin varies depending on specifications such as the size of the laminated iron core 101 and the number of the iron core laminates. In the present embodiment, the resin sealing for a wide range of magnet embedded cores 100 with varying specifications can be performed with an optimum pressurizing force for each of the wide range of magnet embedded cores 100 simply by changing the spring properties of the compression coil springs 68 even though the same resin sealing device 1, lower die 18 and upper die 20 are used. Therefore, the investment for the resin sealing device 1 for performing resin sealing for a wide range of magnet embedded cores 100 can be reduced. In other words, with a minimum investment in the resin sealing device 1, the resin sealing device 1 can be easily adapted to the process of resin sealing for a wide range of magnet embedded cores 100.

Since the compression coil springs 68 are arranged circumferentially at a regular interval around the center of the center hole 102 of the laminated iron core 101 positioned on the lower die 18 via the conveying tray 21, the partial canceling of the clamping force of the toggle link mechanism 42 by the spring force of the compression coil springs 68 is prevented from becoming uneven around the center of the laminated iron core 101.

As a result, the pressurizing force acting on the laminated iron core 101 in the laminating direction in the fully clamped state is prevented from becoming uneven around the center of the laminated iron core 101 owing to the compression coil springs 68 so that undesired distortion of the laminated iron core 101 can be avoided.

Furthermore, the compressive deformation of each compression coil spring 68 is guided by the corresponding tubular member 60 so as not to undergo a bending deformation. In addition, because the moveable member 62 engages the lower die 18 during the movement of the upper die 20 toward the lower die 18, the compression coil spring 68 may be provided with a relatively short length without regard to the opening stroke of the die assembly.

The lower die 18 is fixed to the lower fixed platen 10 while the upper die 20 is fixed to the moveable platen 16, and the compression coil springs 68 are arranged in parallel to one another between the lower die 18 and the upper die 20 so that the spring force of the compression coil springs 68 acts directly upon the lower die 18 and the upper die 20. In particular, the lower die 18 and the upper die 20 are not supported by or suspended from the lower fixed platen 10 or the moveable platen 16 via the compression coil springs 68 in a floating manner. Therefore, the lower die 18 and the upper die 20 are prevented from tilting or otherwise becoming unstable. Owing to such arrangements, a proper clamping action can be ensured at all times.

Other embodiments of the present invention are described in the following with reference to FIGS. 9 to 16. In FIGS. 9 to 15, the parts corresponding to those shown in FIG. 3 are denoted with like numerals, and such parts may be omitted from the following description.

Figure 9:
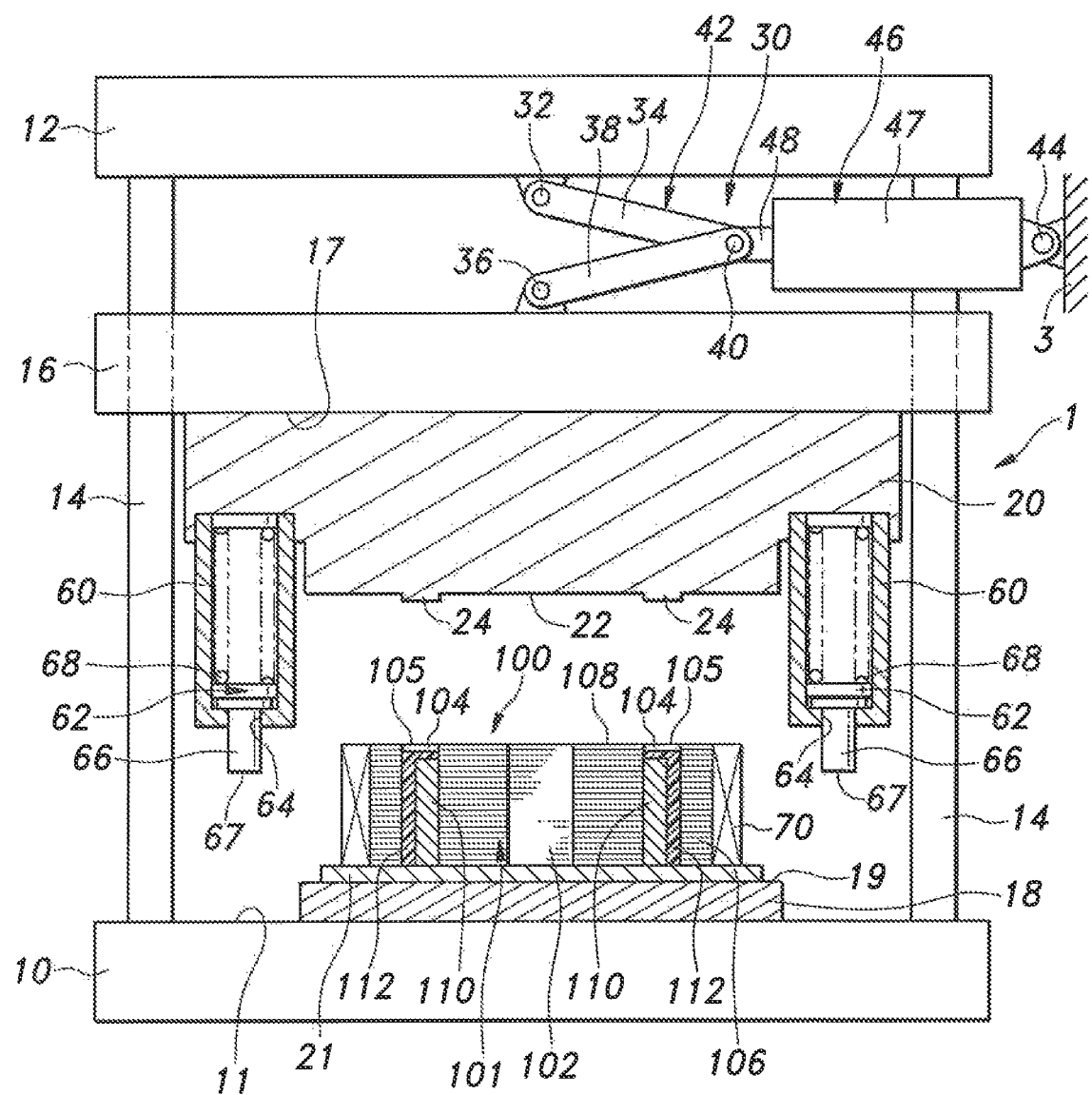
FIG. 9 is a front view of a resin sealing device for the magnet embedded core partly in section according to another embodiment of the present invention.

In the embodiment illustrated in FIG. 9, the tip end surface 67 of each moveable member 62 opposes the upper surface 11 of the lower fixed platen 10 so as to engage the upper surface 11 as the moveable platen 16 descends. In this case, the compression coil springs 68 are interposed between the lower fixed platen 10 and the upper die 20 so as to urge the lower die 18 and the upper die 20 away from each other in a similar manner as in the previous embodiment. This embodiment provides advantages similar to those of the previous embodiment.

Figure 10:
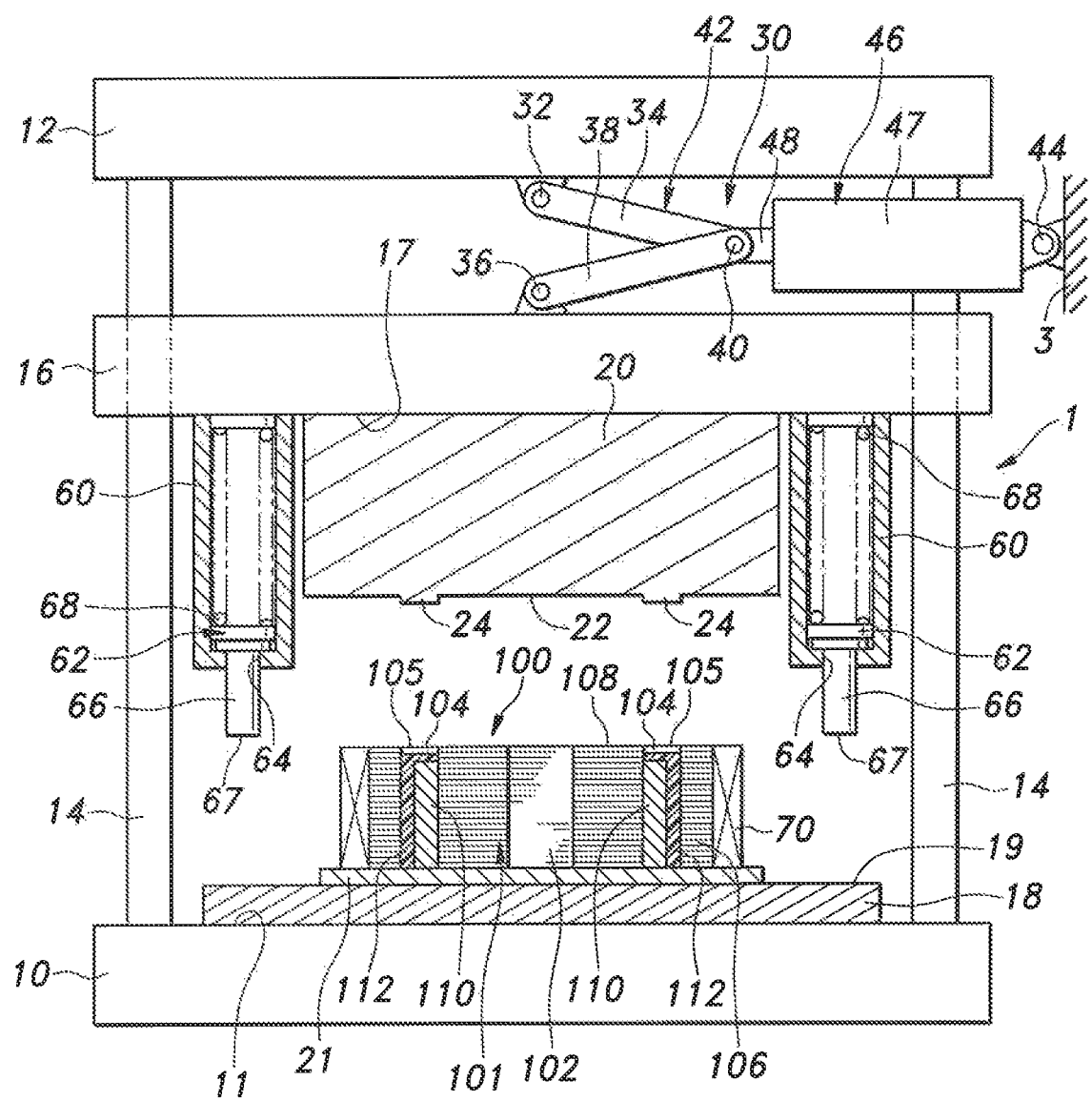
FIG. 10 is a front view of a resin sealing device for the magnet embedded core partly in section according to yet another embodiment of the present invention.

In the embodiment illustrated in FIG. 10, tubular members 60 each fitted with a moveable member 62 and a compression coil spring 68 are attached to the lower surface 17 of the moveable platen 16. The tip end surface 67 of each moveable member 62 opposes the upper surface 19 of the lower die 18 so as to engage the upper surface 19 as the moveable platen 16 descends. In this case, the compression coil springs 68 are interposed between the lower die 18 and the upper moveable platen 16 so as to urge the lower die 18 and the upper die 20 away from each other in a similar manner as in the previous embodiments. This embodiment provides advantages similar to those of the previous embodiments.

Figure 11:
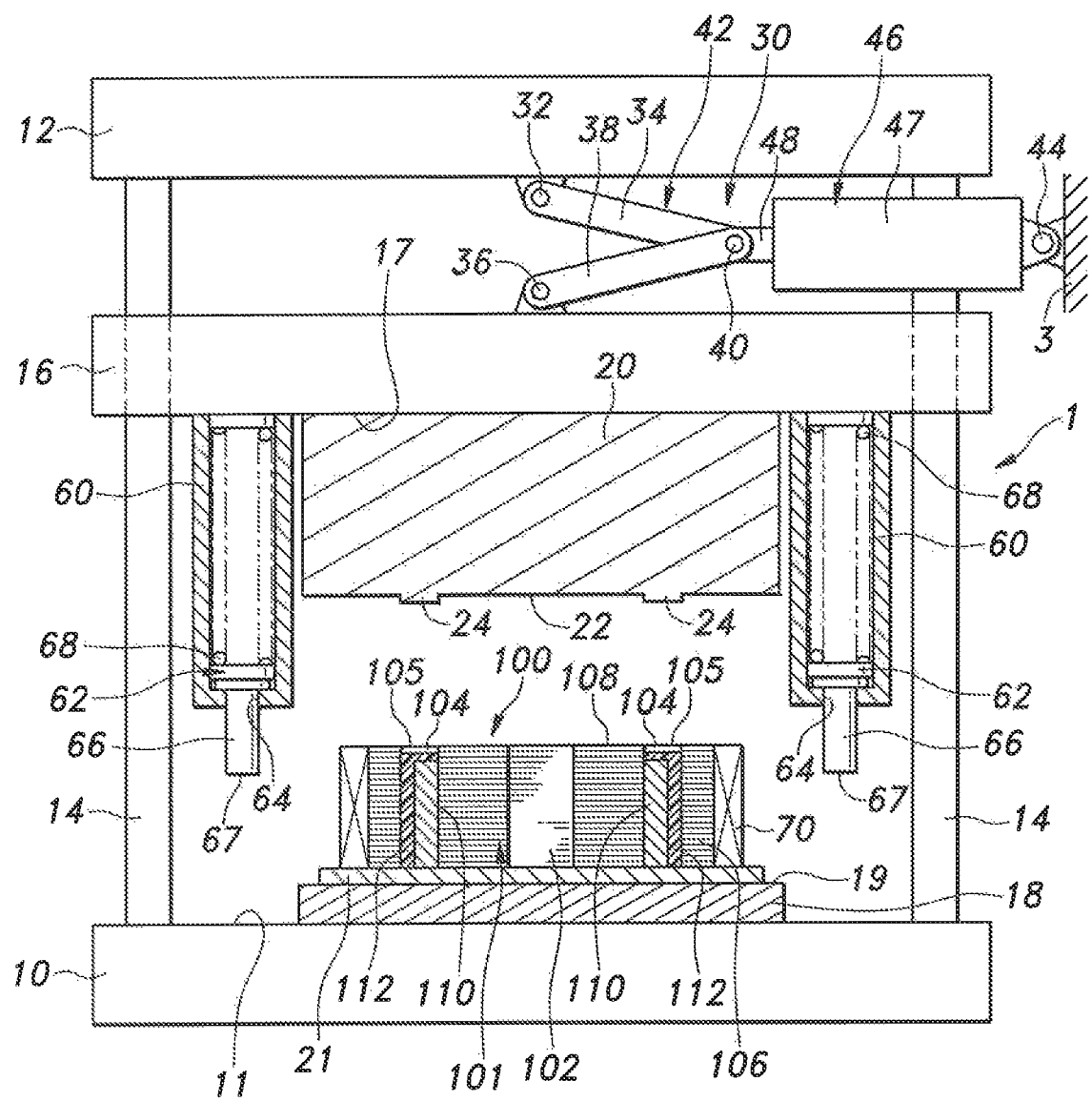
FIG. 11 is a front view of a resin sealing device for the magnet embedded core partly in section according to yet another embodiment of the present invention.

In the embodiment illustrated in FIG. 11, tubular members 60 each fitted with a moveable member 62 and a compression coil spring 68 are attached to the lower surface 17 of the upper moveable platen 16. The tip end surface 67 of each moveable member 62 opposes the upper surface 11 of the lower fixed platen 10 so as to engage the upper surface 11 as the moveable platen 16 descends. In this case, the compression coil springs 68 are interposed between the lower fixed platen 10 and the moveable platen 16 so as to urge the lower die 18 and the upper die 20 away from each other in a similar manner as in the previous embodiments. This embodiment provides advantages similar to those of the previous embodiments.

Figure 12:
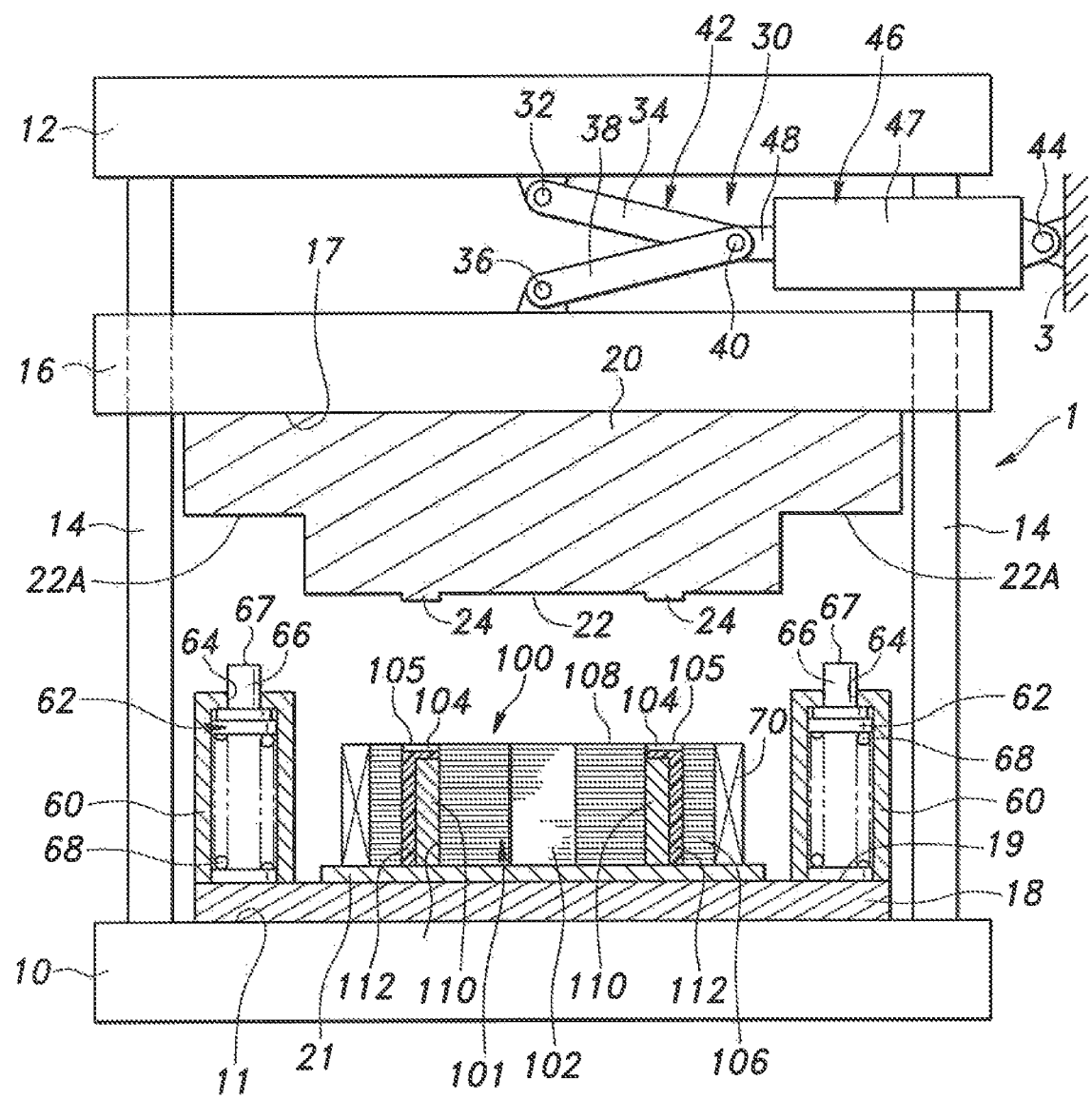
FIG. 12 is a front view of a resin sealing device for the magnet embedded core partly in section according to yet another embodiment of the present invention.

In the embodiment illustrated in FIG. 12, tubular members 60 each fitted with a moveable member 62 and a compression coil spring 68 are attached to the upper surface 19 of the lower die 18. The tip end surface 67 of each moveable member 62 opposes the lower surface 22A of the upper die 20 so as to engage the lower surface 22A as the moveable platen 16 descends. In this case, the compression coil springs 68 are interposed between the lower die 18 and the upper die 20 so as to urge the lower die 18 and the upper die 20 away from each other in a similar manner as in the previous embodiments. This embodiment provides advantages similar to those of the previous embodiments.

Figure 13:
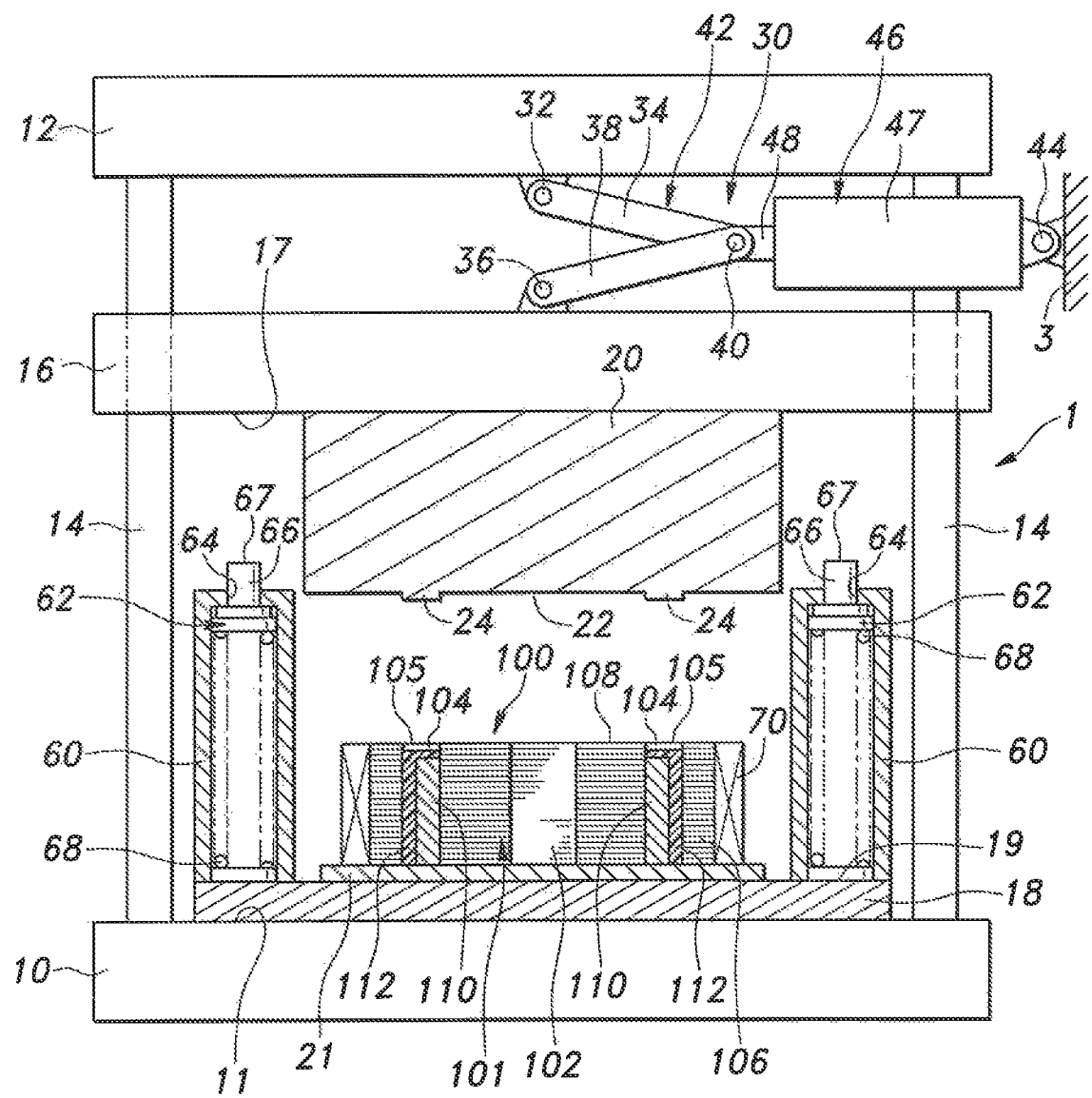
FIG. 13 is a front view of a resin sealing device for the magnet embedded core partly in section according to yet another embodiment of the present invention.

In the embodiment illustrated in FIG. 13, tubular members 60 each fitted with a moveable member 62 and a compression coil spring 68 are attached to the upper surface 19 of the lower die 18. The tip end surface 67 of each moveable member 62 opposes the lower surface 17 of the moveable platen 16 so as to engage the lower surface 17 as the moveable platen 16 descends. In this case, the compression coil springs 68 are interposed between the lower die 18 and the moveable platen 16 so as to urge the lower die 18 and the upper die 20 away from each other in a similar manner as in the previous embodiments. This embodiment provides advantages similar to those of the previous embodiments.

Figure 14:
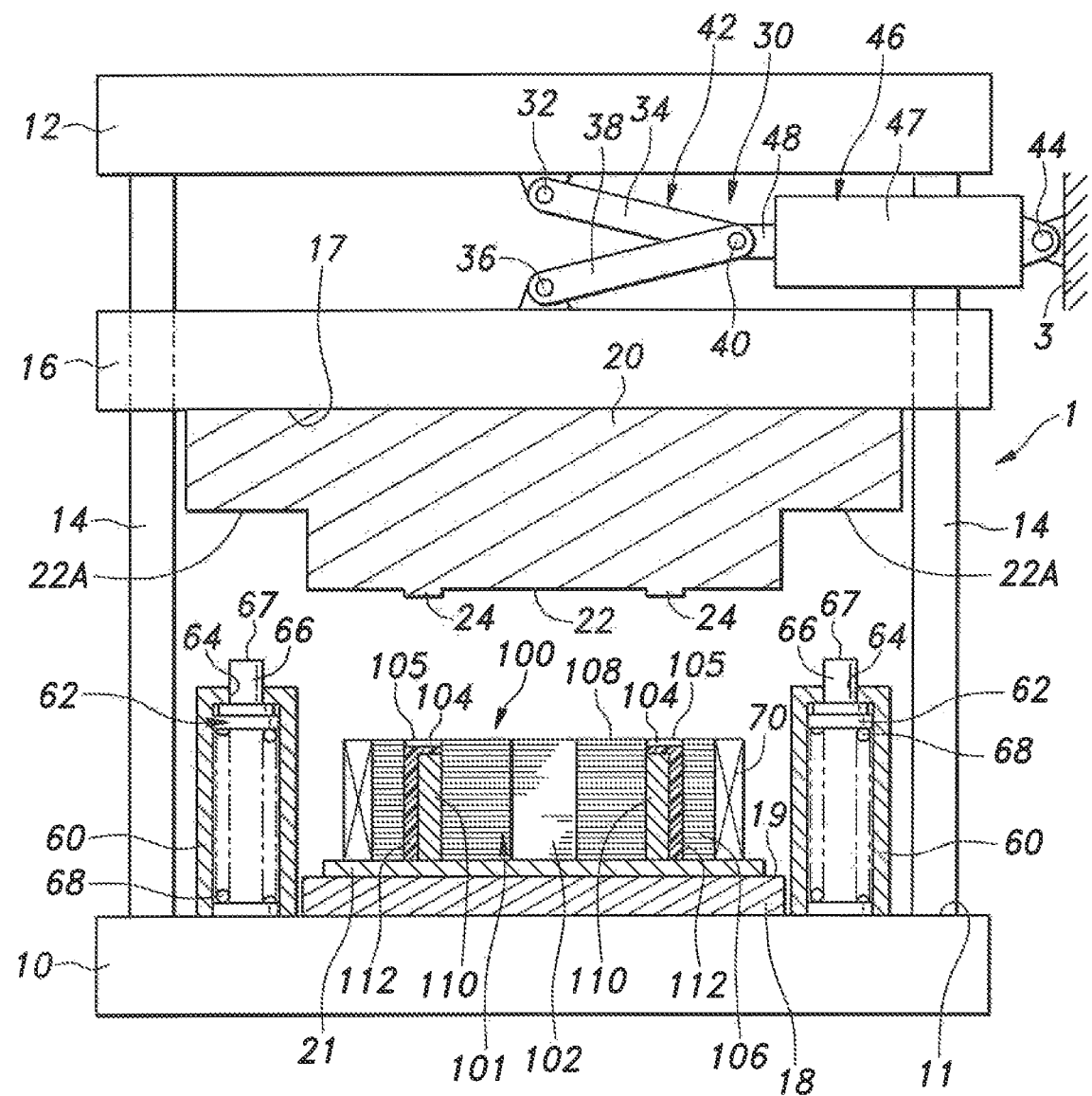
FIG. 14 is a front view of a resin sealing device for the magnet embedded core partly in section according to yet another embodiment of the present invention.

In the embodiment illustrated in FIG. 14, tubular members 60 each fitted with a moveable member 62 and a compression coil spring 68 are attached to the upper surface 11 of the lower fixed platen 10. The tip end surface 67 of each moveable member 62 opposes the lower surface 22A of a peripheral part of the upper die 20 so as to engage the lower surface 22A as the moveable platen 16 descends. In this case, the compression coil springs 68 are interposed between the lower fixed platen 10 and the upper die 20 so as to urge the lower die 18 and the upper die 20 away from each other in a similar manner as in the previous embodiments. This embodiment provides advantages similar to those of the previous embodiments.

Figure 15:
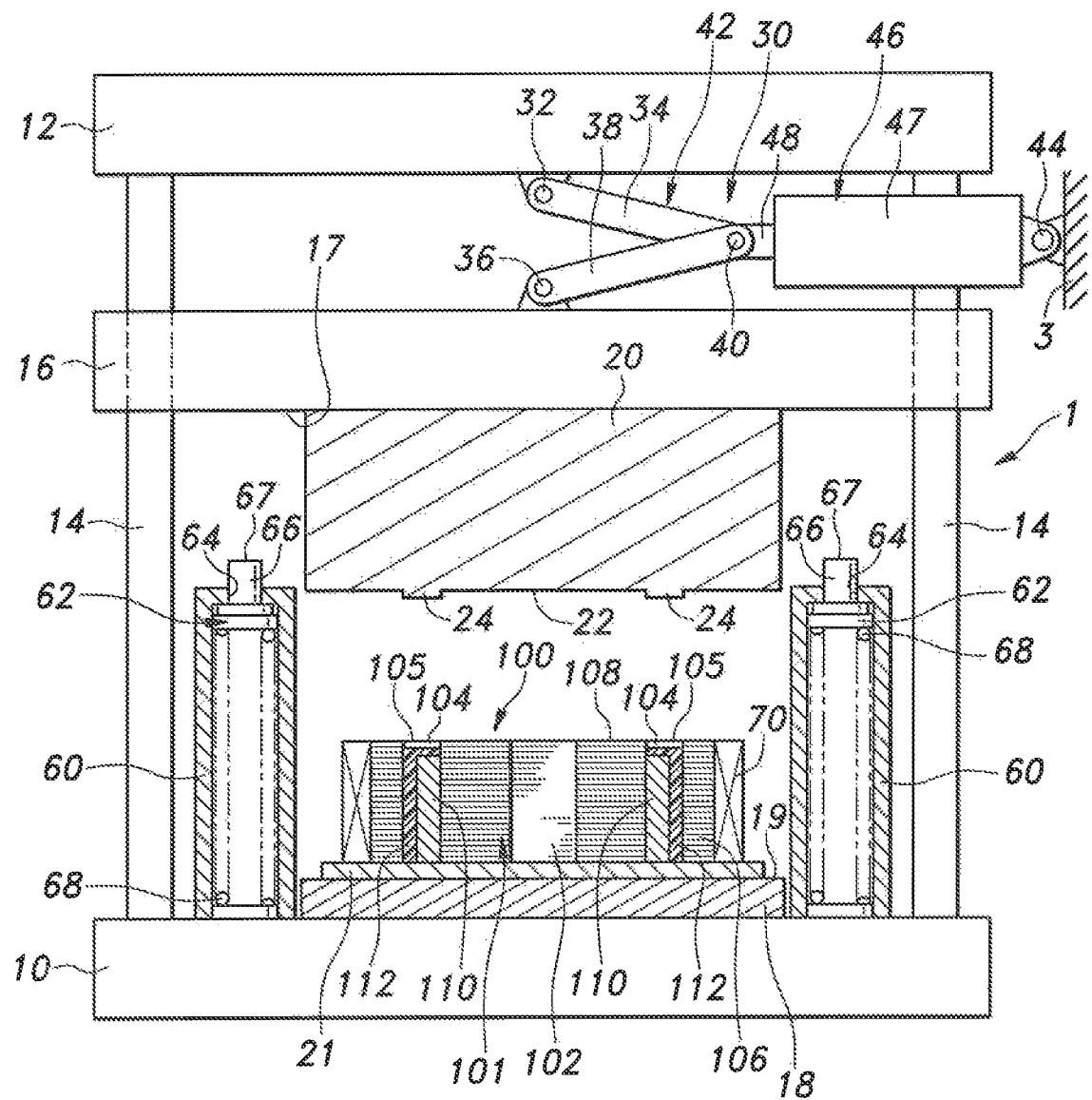
FIG. 15 is a front view of a resin sealing device for the magnet embedded core partly in section according to yet another embodiment of the present invention.

In the embodiment illustrated in FIG. 15, tubular members 60 each fitted with a moveable member 62 and a compression coil spring 68 are attached to the upper surface 11 of the lower fixed platen 10. The tip end surface 67 of each moveable member 62 opposes the lower surface 17 of the moveable platen 16 so as to engage the lower surface 17 as the moveable platen 16 descends. In this case, the compression coil springs 68 are interposed between the lower fixed platen 10 and the moveable platen 16 so as to urge the lower die 18 and the upper die 20 away from each other in a similar manner as in the previous embodiments. This embodiment provides advantages similar to those of the previous embodiments.

The lower die 18 and the upper die 20 are not supported by or suspended from the lower fixed platen 10 or the moveable platen 16 via the compression coil springs 68 in a floating manner. Therefore, the lower die 18 and the upper die 20 are prevented from tilting or otherwise becoming unstable. Owing to such an arrangement, a proper clamping action can be ensured at all times.

In any of the foregoing embodiments, the state where the rated clamping force is produced is not limited to the state where the upper link 34 and the lower link 38 extend in a straight line, and the toggle link mechanism 42 is maximally extended, but may also be a state where the toggle link mechanism 42 achieves a prescribed scissor angle owing to an abutment with a mechanical stopper of the like as long as a stable clamping force can be obtained for a prolonged period of time.

Figure 16:
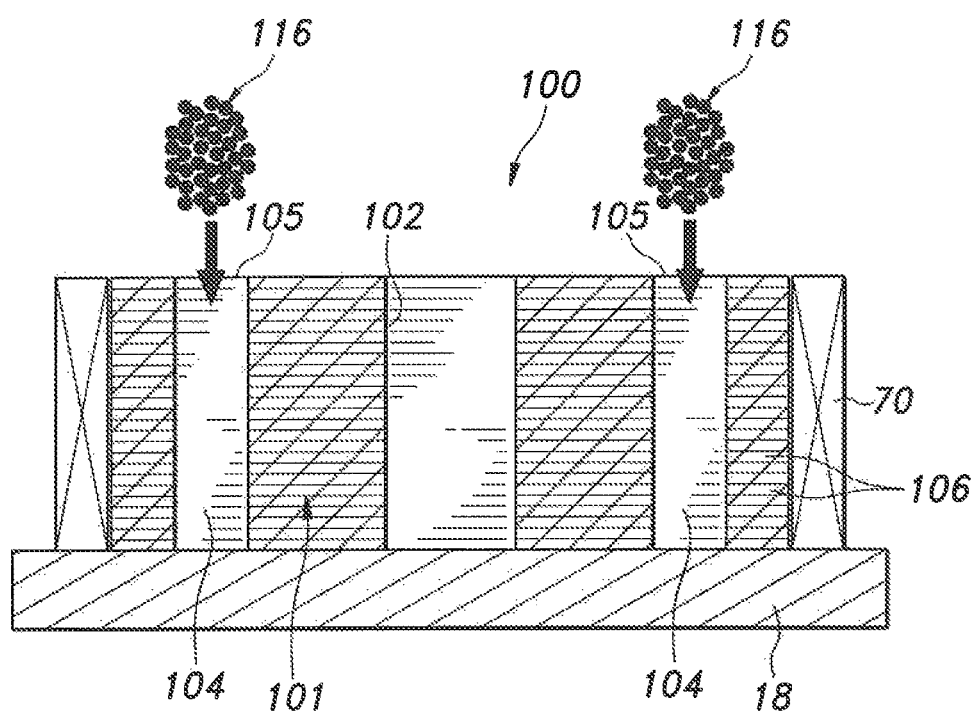
FIG. 16 is a schematic diagram illustrating a modification of the resin charging step.

A modified embodiment of the resin charging step is described in the following with reference to FIG. 16. In this modified embodiment, uncured granular raw material resin 116 is directly charged into the magnet insertion holes 104.

Thereby, the amount of the material resin 116 to be charged into the magnet insertion holes 104 can be correctly and easily measured without regard to the shape of the magnet insertion holes 104 and the required amount of the material resin.

Figure 17:
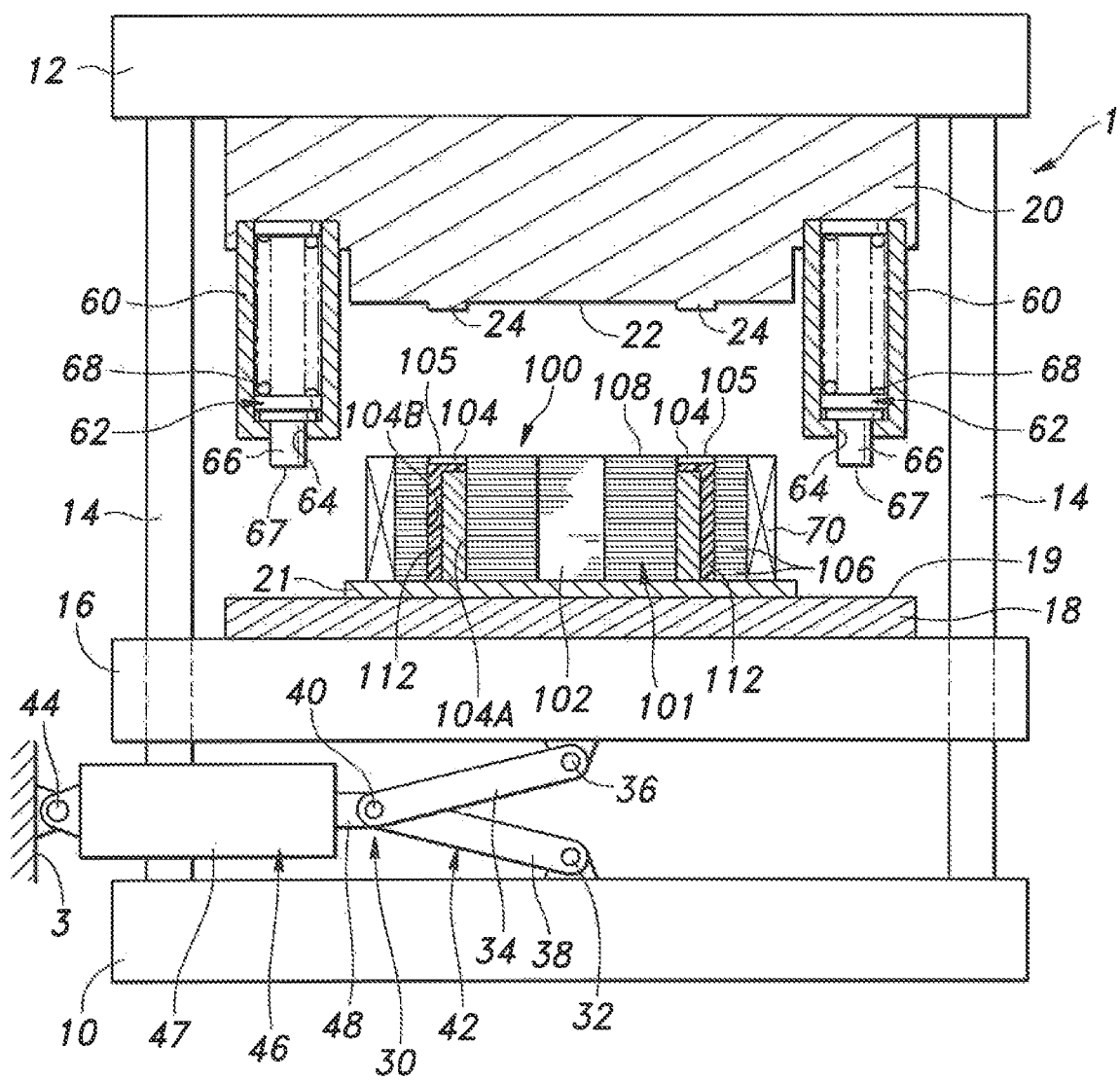
FIG. 17 is a front view of a resin sealing device for the magnet embedded core partly in section according to yet another embodiment of the present invention.
Figure 18:
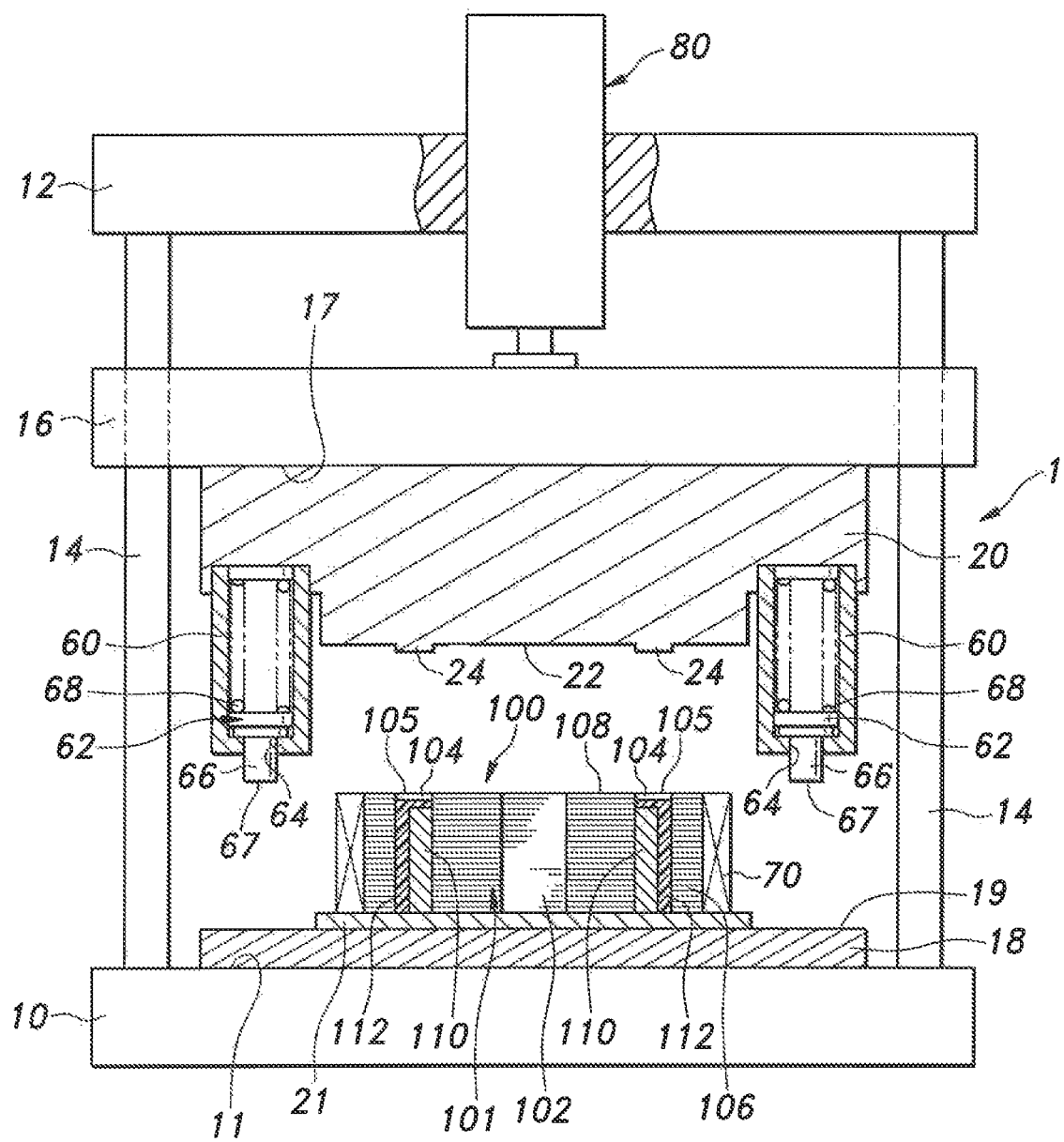
FIG. 18 is a front view of a resin sealing device for the magnet embedded core partly in section according to yet another embodiment of the present invention.

Yet another embodiment of the present invention is described in the following with reference to FIG. 17. In FIG. 17, the parts corresponding to those shown in FIG. 3 are denoted with like numerals, and such parts may be omitted from the following description.

A die clamping device 30 including a toggle link mechanism 42 is provided between the lower fixed platen 10 and moveable platen 16. A lower die 18 serving as a moveable die is attached to the upper surface of the moveable platen 16. An upper die serving as a fixed die is attached to the lower surface of the upper fixed platen 12. A laminated iron core 101 is placed on the lower die 18 via a conveying tray 21.

In this embodiment, as the lower die 18 along with the moveable platen 16 is moved upward by the die clamping device 30, the lower surface 22 of the upper die 20 comes into surface contact with the upper end surface 108 of the laminated iron core 101 placed on the lower die 18 so that the laminated iron core 101 is pressurized in the laminating direction, and the projections 24 are caused to engage the respective magnet insertion holes 104 to close the upper openings 105, and pressurize the resin 112 in the magnet insertion holes 104.

Similarly as in the embodiment illustrated in FIGS. 3 to 6, a plurality of tubular members 60 each having a bottom and extending axially or vertically from the upper die 20 toward the lower die 18 are fixed to the upper die 20 at the upper ends thereof. The tubular members 60 are arranged radially outward of the laminated iron core 101 circumferentially at a regular interval while the laminated iron core 101 is placed in a prescribed position on the lower die 18 via a conveying tray 21. The tubular members 60 each hold a moveable member 62 therein in a vertically slidable manner. Each moveable member 62 is integrally provided with a tip end portion 66 which projects out of the tubular member 60 via a through hole 64 formed in the bottom (lower end) of the tubular member 60. A tip end surface 67 of each tip end portion 66 squarely opposes the upper surface 19 of the lower die 18.

This embodiment also provides advantages similar to those of the embodiment illustrated in FIGS. 3 to 8.

The tubular members 60, the moveable members 62 and the compression coil springs 68 in the embodiment illustrated in FIG. 17 where the laminated iron core 101 is placed on the lower die 18 positioned on the moveable platen 16 may be arranged similarly as in the various embodiments illustrated in FIGS. 9 to 15.

Although the present invention has been described in terms of preferred embodiments thereof, as can be appreciated easily by a person skilled in the art, the present invention is not limited by these embodiments, but can be modified in appropriate ways without departing from the spirit of the present invention.

For instance, the tubular members 60, the moveable members 62 and the compression coil springs 68 are not necessarily arranged around the center of the laminated iron core 101 at a regular interval, but may also be arranged around the center of the laminated iron core 101 at irregular intervals. The compression coil springs 68 may also be interposed between the upper die 20 and the lower die 18 to urge the upper die 20 and the lower die 18 away from each other. Rubber and other elastic members may be used instead of the compression coil springs 68.

The toggle link mechanism 42 may be driven by an electric drive unit using a ball screw and a servomotor, instead of the hydraulic cylinder device 46. In such a case, the maximally extended state of the toggle link mechanism 42 may be detected by any per se known device such as a rotary encoder for detecting the rotational angle of the servomotor. Further, the die clamping device 30 may be driven by a plurality of toggle link mechanisms arranged in parallel to one another.

The die clamping device 30 is not limited to the one using a toggle link mechanism 42, but may also consist of a hydraulic linear actuator type device configured to directly actuate the moveable platen 16 with a hydraulic cylinder device 80. In this case also, the compression coil springs 68 may be utilized in order to achieve a same effect as the toggle link type die clamping device 30 described above.

The magnet insertion holes 104 are not necessarily required to be through holes each having two open ends, but may also be bottomed holes each opening out at only one of the end surfaces of the laminated iron core 101. The charging of the resin into the magnet insertion holes 104 may also be performed by using solid resin in sheet form or the like, instead of the resin block 114 or the granular raw material resin 116. When solid resin is used, since the load in the die opening direction due to the injection pressure of the resin does not act on the die assembly during the resin charging step, a relatively small clamping force may be required. Pressurization of the laminated iron core 101 at the time of the die clamping step is not necessarily required, and may only be required to the extent necessary for removing air bubbles from the resin 112 in the magnet insertion holes 104.

The charging of resin into the magnet insertion holes 104 may also be performed by injecting resin in liquid form into the magnet insertion holes 104 after the die assembly has been closed. In this case, a lateral type resin sealing device may be used.

The heating of the resin block 114 with the heat of the magnet pieces 110 in the melting step is not essential for the present invention, and the preheating of the magnet pieces 110 may be omitted.

The lower die 18 may be configured to be moveable relative to the lower fixed platen 10 so that the lower die 18 may also serve as a conveying tray 21. In such a case, the tubular members 60, the moveable members 62 and the compression coil springs 68 may be provided on the side of the upper die 20 so that these component may not prevent the movement of the lower die 18 in functioning as a conveying tray, and when a plurality of lower dies 18 are used, these components are not required to be provided for each lower die 18. It should be also noted that the conveying tray 21 is not essential for the present invention.

In an alternate arrangement, the die clamping device 30 is provided between the lower fixed platen 10 and the moveable platen 16, and the lower die 18 is provided on the moveable platen 16 while the upper die is provided on the lower surface of the lower fixed platen 10 so that the lower die 18 along with the moveable platen 16 may undergo the vertical movement.

The constituent elements of the foregoing embodiments are not entirely essential for the present invention, but may be suitably omitted or substituted without departing from the spirit of the present invention.

Glossary of Terms

| 1 | resin sealing device | 3 | fixed frame |
|---|---|---|---|
| 10 | lower fixed platen | 11 | upper surface |
| 12 | upper fixed platen | 14 | tie bar |
| 16 | moveable platen | 17 | lower surface |
| 18 | lower die | 19 | upper surface |
| 20 | upper die | 21 | conveying tray |

| | | | |
|---|---|---|---|
| 22 | lower surface | 22A | lower surface |
| 24 | projection | 30 | die clamping device |
| 32 | pivot shaft | 34 | upper link |
| 36 | pivot shaft | 38 | lower link |
| 40 | pivot shaft | 42 | toggle link mechanism |
| 44 | pivot shaft | 46 | hydraulic cylinder device |
| 47 | cylinder tube | 48 | piston rod |
| 60 | tubular member | 62 | moveable member |
| 64 | through hole | 66 | tip end portion |
| 67 | tip end surface | 68 | compression coil spring |
| 70 | heating device | 80 | hydraulic cylinder device |
| 100 | magnet embedded core | 101 | laminated iron core |
| 102 | center hole | 104 | magnet insertion hole |
| 104A | inner surface | 104B | inner surface |
| 105 | upper opening | 106 | iron core laminate |
| 108 | upper end surface | 110 | magnet piece |
| 110A | outer surface | 112 | resin |
| 114 | resin block | 114A | outer surface |
| 114B | outer surface | 116 | material resin |

The invention claimed is:

1. A resin sealing device for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, the resin sealing device comprising:
a fixed platen;
a moveable platen placed opposite to the fixed platen so as to be moveable in a direction toward and away from the fixed platen;
a die clamping device configured to drive the moveable platen in the direction toward and away from the fixed platen;
a fixed die attached to the fixed platen; and
a moveable die attached to the moveable platen,
wherein one of the fixed die and the moveable die is configured to place the laminated iron core thereon, and the other of the fixed die and the moveable die is configured to abut onto the end surface of the laminated iron core upon clamping by the die clamping device to close the openings of the magnet insertion holes and pressurize the laminated iron core in a laminating direction,
the resin sealing device further comprising:
an elastic member positioned between the fixed die or the fixed platen and the moveable die or the moveable platen to urge the fixed die and the moveable die away from each other;
a tubular member having an axial direction coinciding with the direction toward and away from the fixed platen and projecting from one of the moveable die or the moveable platen and the fixed die or the fixed platen toward the other, and
a moveable member provided on the tubular member so as to be moveable in the axial direction relative to the tubular member,
wherein the elastic member comprises a compression coil spring positioned in the tubular member to urge the moveable member toward the other of the moveable die or the moveable platen and the fixed die or the fixed platen, and the moveable member includes a tip end portion configured to abut the other of the moveable die or the moveable platen and the fixed die or the fixed platen during a movement of the moveable die toward the fixed die.

2. The resin sealing device for manufacturing a magnet embedded core as defined in claim 1, wherein the die clamping device comprises a toggle link.

3. The resin sealing device for manufacturing a magnet embedded core as defined in claim 1, wherein the elastic member comprises a plurality of elastic members configured to be positioned radially outside of the laminated iron core around a center of the laminated iron core.

4. The resin sealing device for manufacturing a magnet embedded core as defined in claim 1, wherein the elastic member comprises a plurality of elastic members configured to be positioned around a center of the laminated iron core at a regular interval.

5. A resin sealing method for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole,
wherein the resin sealing method uses a resin sealing device including a fixed platen, a moveable platen placed opposite to the fixed platen so as to be moveable in a direction toward and away from the fixed platen, a die clamping device configured to drive the moveable platen in the direction toward and away from the fixed platen, a fixed die attached to the fixed platen, and a moveable die attached to the moveable platen,
the method comprising:
an iron core positioning step of positioning the laminated iron core on one of the fixed die and the moveable die;
a resin charging step of charging the resin into the magnet insertion holes;
a magnet piece insertion step of inserting the magnet pieces in the respective magnet insertion holes; and
a pressurizing step of causing, by use of the die clamping device, the other of the fixed die and the moveable die to abut onto the end surface of the laminated iron core to close the openings of the magnet insertion holes and pressurize the laminated iron core in a laminating direction with the other of the fixed die and the moveable die,
wherein during the pressurizing step, a pressurizing force acting on the laminated core in a clamped state provided by the die clamping device is reduced by an urging force of an elastic member interposed between the moveable die and the fixed die to urge the fixed die and the moveable die in a direction away from each other,
the resin charging step includes a step of charging the resin in solid state into the magnet insertion holes, and
the method further comprises a melting step of melting the resin in solid state in the magnet insertion holes, and a curing step of curing the resin in molten state in the pressurizing step.

* * * * *